United States Patent
Kataoka et al.

(10) Patent No.: US 8,491,353 B2
(45) Date of Patent: Jul. 23, 2013

(54) MOLD FOR OPTICAL COMPONENTS

(75) Inventors: Hidenao Kataoka, Osaka (JP); Xinbing Liu, Acton, MA (US); Christian F. Greig, Westford, MA (US)

(73) Assignee: Panasonic Corporation, Osaka (JP)

(*) Notice: Subject to any disclaimer, the term of this patent is extended or adjusted under 35 U.S.C. 154(b) by 1680 days.

(21) Appl. No.: 10/567,324

(22) PCT Filed: Sep. 30, 2004

(86) PCT No.: PCT/US2004/033055
§ 371 (c)(1),
(2), (4) Date: Aug. 23, 2007

(87) PCT Pub. No.: WO2005/032725
PCT Pub. Date: Apr. 14, 2005

(65) Prior Publication Data
US 2008/0030876 A1    Feb. 7, 2008

Related U.S. Application Data

(60) Provisional application No. 60/507,660, filed on Sep. 30, 2003.

(51) Int. Cl.
*B24B 7/24* (2006.01)

(52) U.S. Cl.
USPC ............ 451/42; 451/41; 216/24; 216/26; 65/61

(58) Field of Classification Search
USPC . 451/41, 42; 216/24, 26; 65/37, 61; 128/898; 606/4, 5; 351/159.01
See application file for complete search history.

(56) References Cited

U.S. PATENT DOCUMENTS 5,350,374 A * 9/1994 Smith .................... 606/5
5,490,849 A   2/1996 Smith (Continued)

FOREIGN PATENT DOCUMENTS

CN  1253487     5/2000
JP  08-132259   5/1996

(Continued)

OTHER PUBLICATIONS

Chinese Office Action together with English Translation for Chinese Appln. No. 200480006270.8, dated Jul. 13, 2010.

(Continued)

*Primary Examiner* — Ahmed Farah
(74) *Attorney, Agent, or Firm* — RatnerPrestia

(57) ABSTRACT

A method is provided for manufacturing a high-precision mold whereby a feature matching a desired feature design is carved into a hard mold material (41) using, for example, a diamond grinding wheel and/or a diamond turning point. Inherent imprecision and errors (49) introduced by the use of the grinding wheel/turning point are measured to determine deviations from the desired feature design. An ultrafast short-pulse laser is then activated to desirably ablate the deviations, thereby correcting the errors and conforming the feature to the desired shape. Furthermore, a thin film (1602) may be formed over the feature either prior to or after the laser ablation process, where the error measurement and laser ablation processes detects and ablates errors on the surface of the thin film, respectively. Additionally, the laser ablation process may be applied directly to, for example, an optical lens (1400) formed from an imprecise mold to remove any errors and imperfections thereon.

13 Claims, 19 Drawing Sheets

U.S. PATENT DOCUMENTS

| | | | |
|---|---|---|---|
| 5,609,779 | A | 3/1997 | Crow et al. |
| 5,643,249 | A | 7/1997 | Amana |
| 5,782,822 | A * | 7/1998 | Telfair et al. ............... 606/5 |
| 2002/0013575 | A1 * | 1/2002 | Lai et al. ................... 606/5 |
| 2002/0049511 | A1 * | 4/2002 | Brandinger et al. ......... 700/166 |
| 2004/0092914 | A1 * | 5/2004 | Bille ........................ 606/5 |

FOREIGN PATENT DOCUMENTS

| | | |
|---|---|---|
| JP | 2002-25949 | 1/2002 |
| JP | 2002-222772 | 8/2002 |
| WO | WO 98/48746 | 11/1998 |
| WO | WO 01/15592 A2 | 3/2001 |
| WO | WO 02/11194 | 2/2002 |

OTHER PUBLICATIONS

Japanese Office Action dated Sep. 10, 2010.
Chinese Office Action together with English Translation for Chinese Appln. No. 200480006270.8, 12 pgs.
International Search Report dated Mar. 14, 2005, application No. PCT/US2004/033055.

* cited by examiner

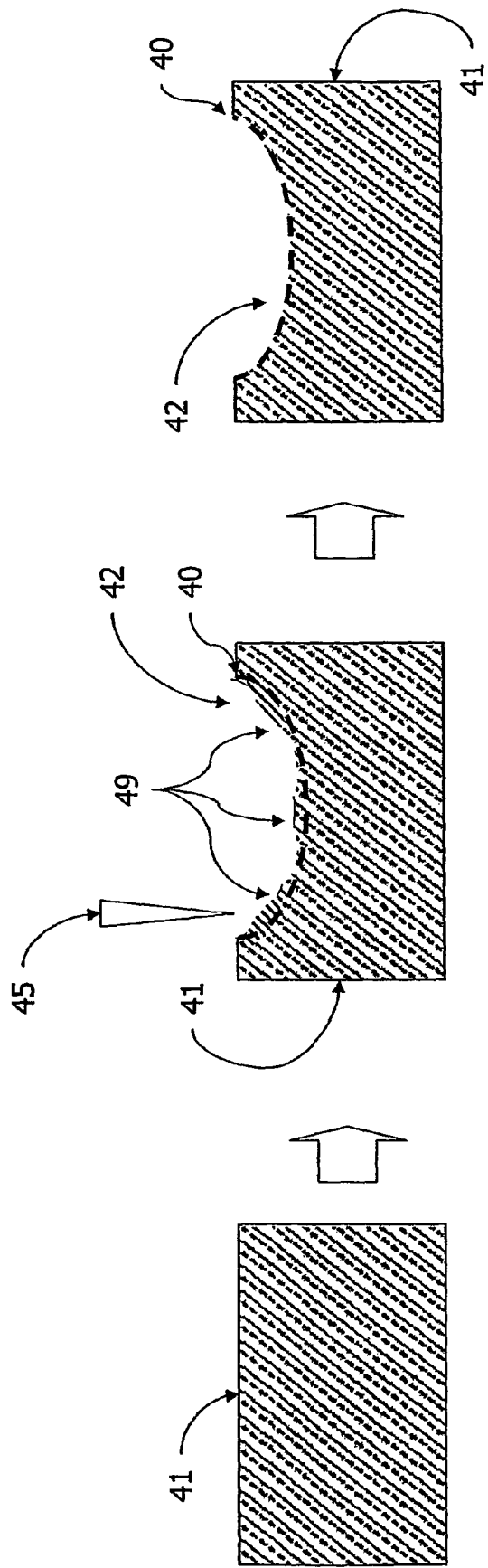

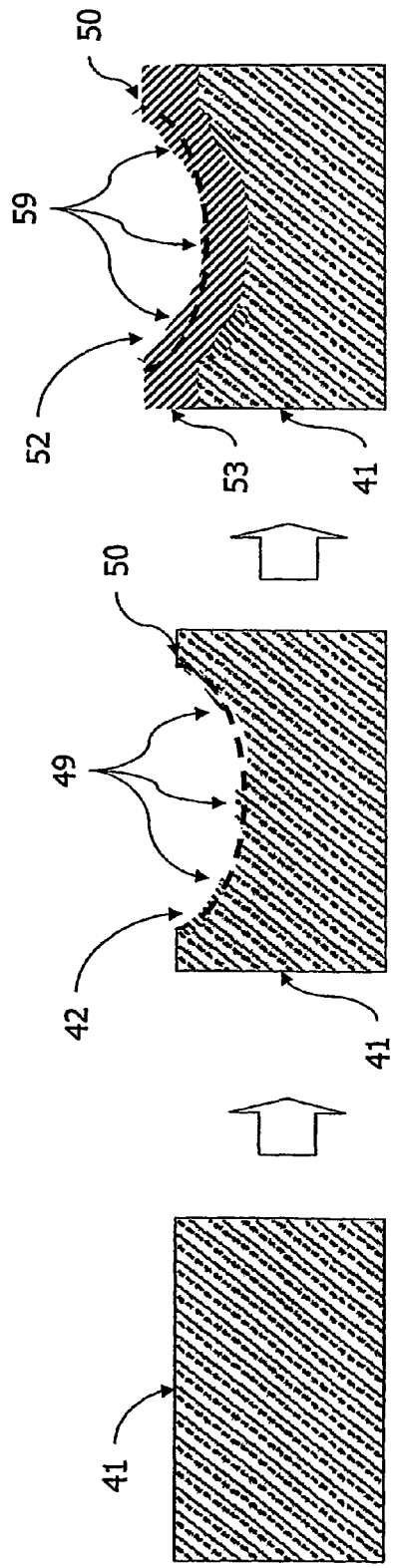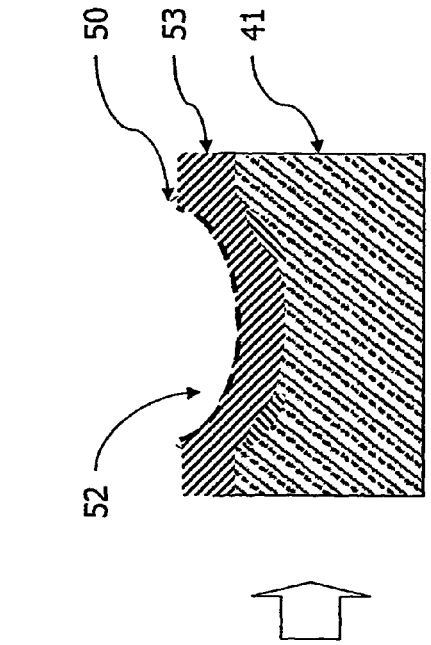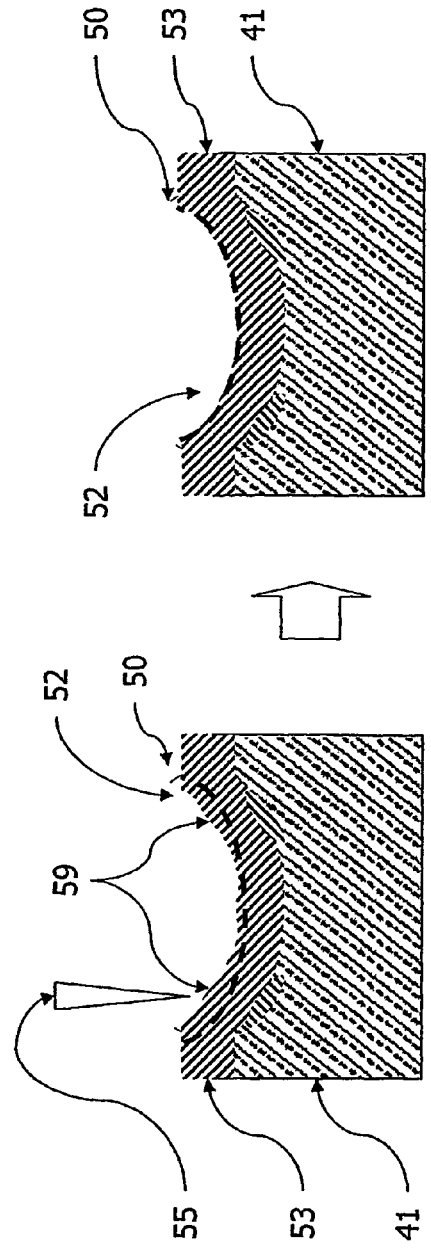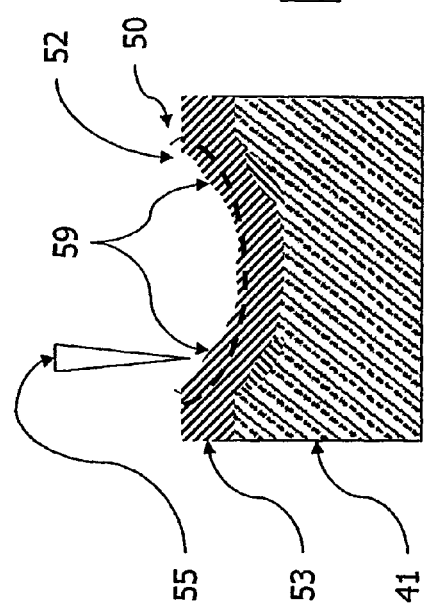
Fig. 5A  Fig. 5B  Fig. 5C  Fig. 5D  Fig. 5E

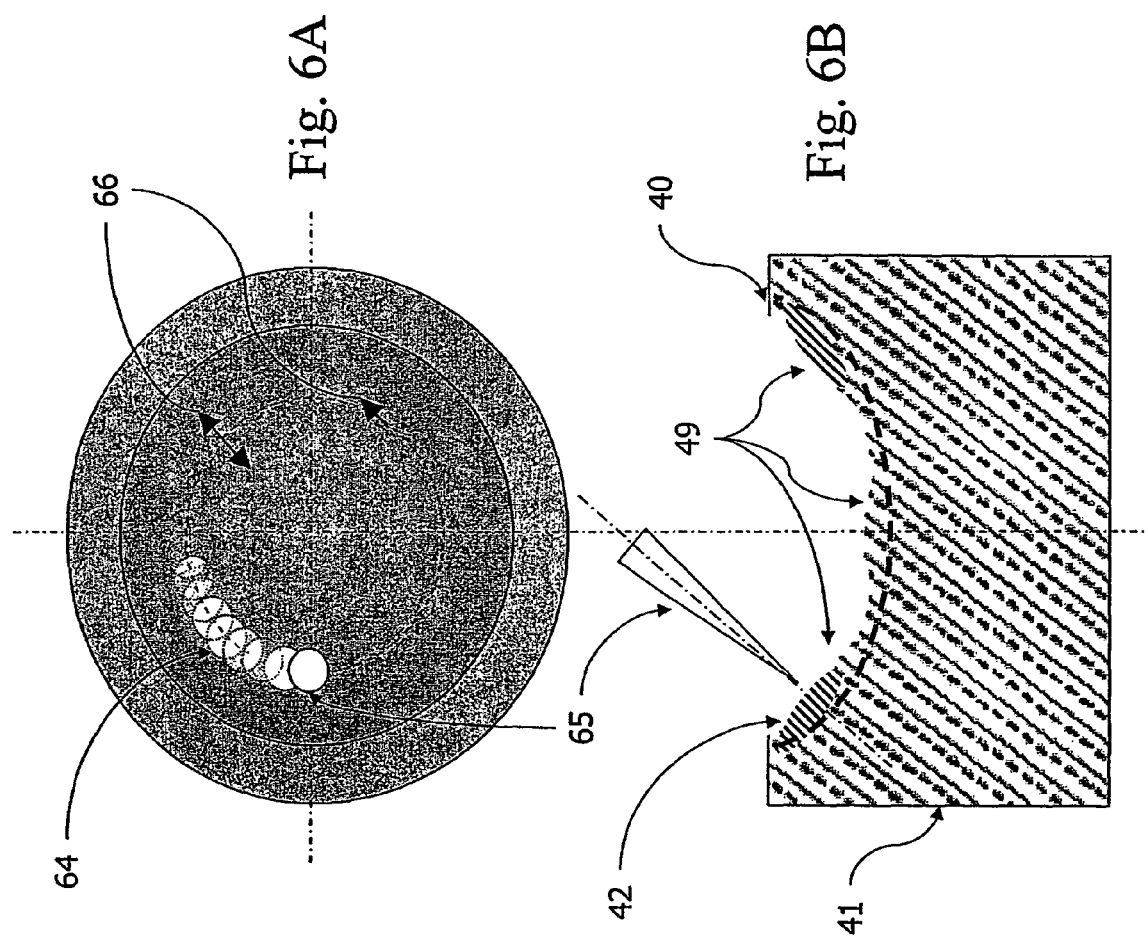

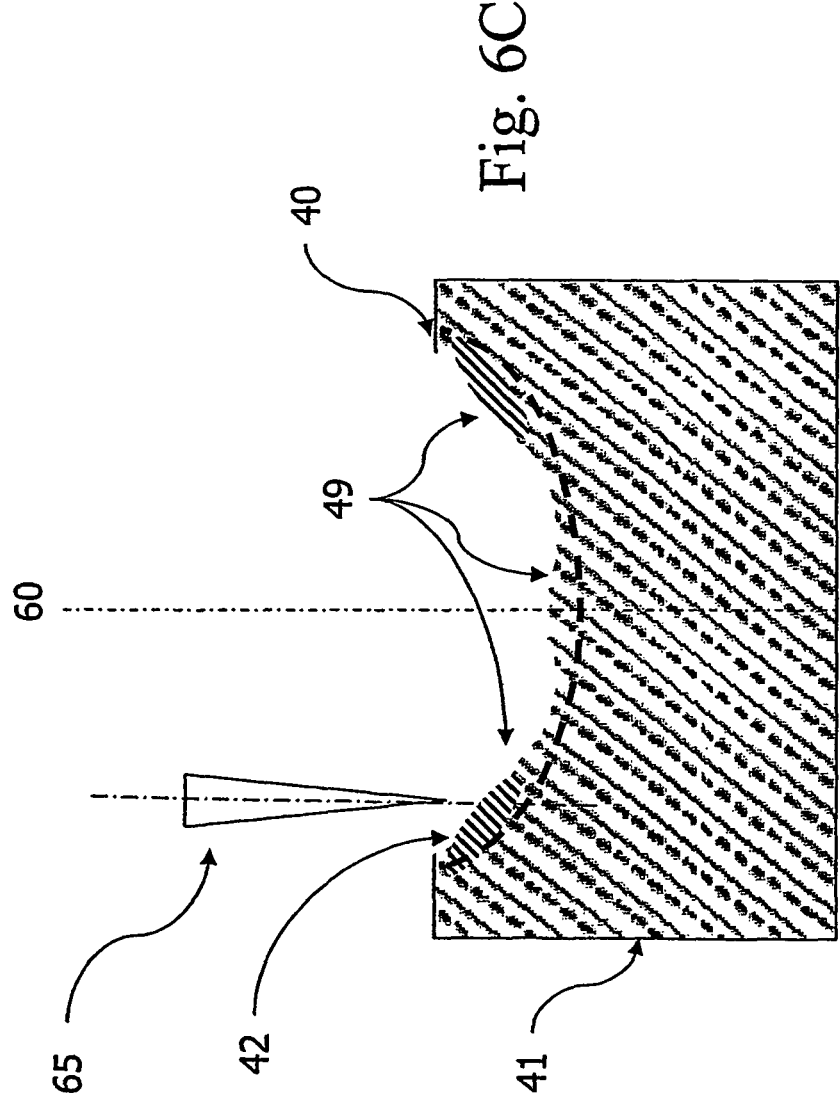

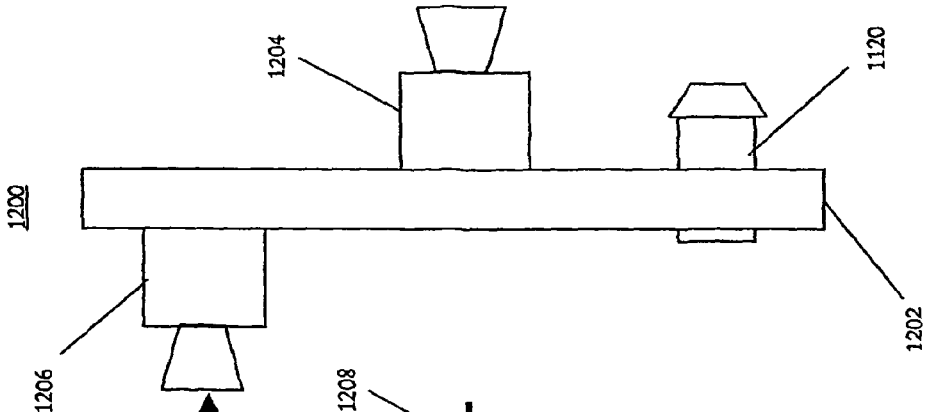
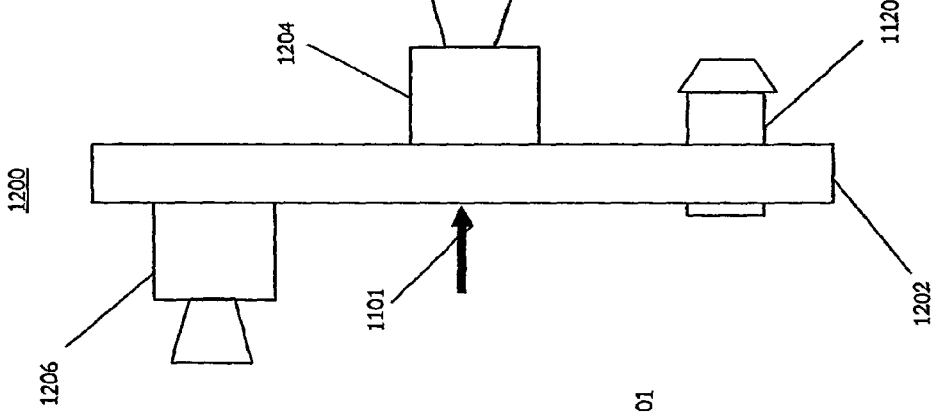
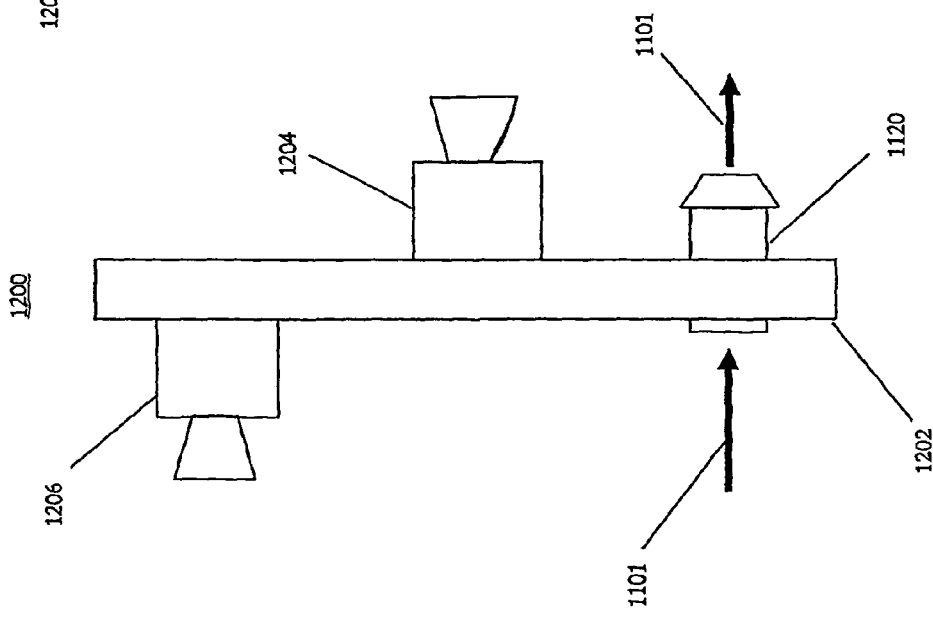

MOLD FOR OPTICAL COMPONENTS

This is a U.S. national Phase of International Application No. PCT/US 2004/033055 filed Sep. 30, 2004.

FIELD OF THE INVENTION

The present invention relates generally to a system and method for manufacturing and/or refining a surface, as well as to devices manufactured using this system and/or method. More particularly the system and method may be used to produce high-precision optical lens molds using a laser ablation process.

BACKGROUND OF THE INVENTION

The use of molds in modern manufacturing of devices is a well known process dating back to ancient times. Most recently, however, precision mold castings have been used by optical equipment manufacturers in the production of optical lenses. Devices incorporating one or more of optical imaging, optical telecommunications, and optical data storage technologies are becoming increasingly prevalent. Many of these products use one or more optical lenses. Consequently, it is highly desirable that the optical lenses used in various devices meet their design specifications as precisely as possible. It may also be desirable to maintain economically feasible manufacturing methods in the production of such lenses so that the lenses may be desirably priced in the marketplace.

As demand for high performance optical equipment has grown, devices have become smaller and more precise. As a result, these devices require difficult-to-manufacture high-precision optical lenses in order to meet performance requirements. The Blu-Ray optical storage standard, for example, uses a short wavelength laser (blue laser) to allow more data to be stored on optical storage discs, as opposed to current standards (CD, DVD) that use red laser light. The shorter wavelength laser requires a smaller, more precise lens with desirably minimal imperfections on the surface thereof.

A current method of manufacturing high-precision lenses is illustrated in FIGS. 1A and 1B, and includes forming a mold cavity 2 into a hard mold material 1, where the mold cavity 2 matches the lens design of a desired optical lens geometry. The mold cavity 2 is generally ground and/or cut from the mold material 1 using at least one of a diamond grinding wheel 10 (show in FIG. 1A and 1B) attached to a movement arm 14 or a diamond turning point 12 (shown in FIG. 2) that perform a predetermined carving algorithm 16 (exemplary, as shown in FIGS. 1A, 1B, and 2). After the final mold Is finished, optical lens material is set inside of the mold and desirably pressed under high temperature and pressure in order to form the optical lens (not shown in FIG. 1). Those skilled In the art will recognize that other methods may be used with the final finished mold to form an optical lens.

It is generally possible to achieve a design precision of around ±0.1 microns using the prior art method described above. However, the grinding/cutting process introduces mold cavity surface errors that do not meet nanometer and sub-nanometer precision required by high-precision optical lenses, such as those needed for the Blu-ray standard. As illustrated in FIGS. 1A and 1B, the surface errors are as a result of undesirable bending of the shank 14 of the movement arm and/or vibration of the shank 14 and/or the grinding wheel 10. As shown in FIG. 2, similar defects may be caused by bending or vibration of the shaft 20 and/or diamond turning point 12. Undesirable defects may also result from temperature- or pressure-induced changes at the turning point-cavity surface interface 24, as well as the inherent imprecision of mechanical manufacturing tools (not shown in FIG. 2). Furthermore, the grinding wheel/turning point experiences wear and may become less accurate after prolonged use, introducing undesirable manufacturing costs in their replacement and in extra machining of the mold.

Additionally, an optical lens mold 31 having a cavity 32 may be desirably finished with the application of a thin film 33 over at least the cavity 32 (as shown in FIG. 3). The application of the thin film may, for example, prevent undesirable bonding between optical lens material and mold 31 during the pressing process. The application of the thin film, however, may also introduce undesirable undulations on the thin film surface, thereby introducing additional errors to the manufacturing process of high-precision lenses.

Current methods aimed at reducing errors in optical lens manufacturing generally involve the production of an optical lens mold, as described above, from which an imperfect optical lens is produced. Then, an optician manually refines the lens surface to remove surface errors identified from measurements made, for example, with a laser interferometer. Other, more complex, automated methods exist such as magnetorhelogical finishing developed by the Center for Optics Manufacturing (COM) in Rochester, N.Y. However, these processes may introduce additional undesirable surface errors on a lens, and generally do not achieve the nanometer and sub-nanometer precision desirable in higher performance optical devices.

SUMMARY OF THE INVENTION

The present invention is embodied in a method of improving the shape of a high-precision surface, comprising the steps of providing a block of material with a feature on a surface thereof, measuring surface errors of the feature caused by material that extends from the feature away from a desired feature shape, and correcting the surface errors of the feature by activating a pulsed laser beam over the errors to ablate the material extending from the feature.

In a further embodiment, the block of material is a mold, the feature is a cavity, and the surface errors are caused by mold material that extends into the cavity away from a desired cavity shape. Alternatively, the surface errors may be tooling marks from a previous mechanical processing step.

In another embodiment of the present invention, a thin film material is deposited over the feature after the errors have been desirably corrected. Alternately, the thin film material is deposited over the feature before the errors have been measured and corrected, where measuring surface errors of the feature measures surface errors caused by portions of the material extending from the thin film surface and away from a desired feature shape. The pulsed laser beam is activated over the errors and ablates the portions of the material extending from the thin film surface and away from the desired feature shape. Alternately, a block of mold material with a feature on a surface thereof and a thin film material deposited over the feature may be provided without depositing the thin film material as described above.

In an alternate embodiment, an optical lens with surface errors thereon caused by lens material that extends from the lens surface away from a desired lens shape is provided, where the surface errors are measured and then corrected by activating a pulsed laser beam over the errors to desirably ablate the lens material extending from the lens surface away from a desired lens shape. In a further embodiment, the lens material extending from the lens surface away from a desired lens shape of the optical lens Is substantially covered by a substantially optically absorptive material prior to activating the pulsed laser beam over the errors.

An additional exemplary embodiment of the present invention is a laser machining system for improving a shape of a high-precision surface of a device by ablating device material from portions of the high-precision surface that deviate from a predetermined surface design shape. This laser machining system includes: a pulsed laser source for generating a pulses of laser light; a shutter aligned in a beam path of the pulses of laser light; optics aligned in the beam path to focus the pulses of laser light to a beam spot; a device mount to hold and controllably move the device such that the beam spot is scanned over the high-precision surface of the device; and a processor. Each pulse of laser light has a predetermined peak wavelength, a pulse energy equal to a machining energy level, and a predetermined pulse width less than about 1 ns. The device mount includes: three orthogonal linear translation stages; a Θ rotational stage coupled to the three orthogonal linear translation stages to rotate the device about a Θ axis orthogonal to a direction of propagation of the pulses of laser light at the beam spot, the Θ rotational stage allowing rotation of the device through an angle of substantially 180°; a φ rotational stage coupled to the Θ rotational stage to rotate the device about a φ axis orthogonal to the Θ axis, the φ axis varying as the Θ rotational stage is rotated; and a holder coupled to the φ rotational stage to hold the device. The processor controls: the pulse energy of the pulses of laser light at the machining energy level and the diameter of the beam spot such that each pulse of laser light ablates an ablation depth of device material from the high-precision surface; and the shutter and the device mount such that the portions of the high-precision surface that deviate from the predetermined surface design shape are irradiated by the plurality of laser pulses.

Yet another exemplary embodiment of the present invention is a multi-position in situ diagnostics apparatus for use with a laser machining system. The multi-position in situ diagnostics apparatus includes: a multi-position in situ diagnostics shuttle; an objective lens mounted on the multi-position in situ diagnostics shuttle; and a forward-facing beam alignment camera mounted on the multi-position in situ diagnostics shuttle. The multi-position in situ diagnostics shuttle is arranged such that: in a first shuttle position, the objective lens is aligned in a beam path of the laser machining system to focus laser light of the laser machining system to a beam spot on a surface; and in a second shuttle position, the forward-facing beam alignment camera is aligned collinear to the beam path and images the surface of the device corresponding to a location of the beam spot when the multi-position in situ diagnostics shuttle is in the first position. This produces an alignment image for determining initial beam alignment of the laser machining system on the surface.

Yet a further exemplary embodiment of the present invention is an improved aspherical and/or asymmetric lens for use with short wavelength light. The aspherical lens is formed of a lens material that includes: a first light refracting surface having a first aspherical surface shape matching a predetermined first aspherical surface design shape with a first surface maximum deviation of less than about 1 μm; and a second light refracting surface opposite the first light refracting surface, the second light refracting surface having a second surface shape matching a predetermined second surface design shape with a second surface maximum deviation of less than about 1 μm.

Yet an additional exemplary embodiment of the present invention is an Improved compression mold for short wavelength aspherical lenses, short wavelength asymmetric lenses, and/or microstructures. The compression mold including a mold body formed of a mold material. The mold body including a mold surface having an aspherical mold surface shape that matches a predetermined aspherical surface design shape with a mold surface maximum deviation of less than about 1 μm.

Still another exemplary embodiment of the present invention is an improved release film for a compression mold. The release film includes release film material formed on a mold surface of the compression mold. The release surface, opposite the mold surface, of the release film material has a release surface shape matching a predetermined surface design shape with a maximum deviation of less than about 1 μm.

Further embodiments of the present invention may also include the step of grinding/cutting the feature on the surface of the mold, where the feature Is a cavity, and grinding/cutting the feature introduces cavity surface errors caused by mold material that extends into the cavity away from a desired cavity shape.

It is to be understood that both the foregoing general description and the following detailed description are exemplary, but are not restrictive, of the invention.

BRIEF DESCRIPTION OF THE DRAWING

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures.

FIGS. 4A, 4B, and 4C are cross-sectional side plan drawings of an apparatus according to an exemplary embodiment of the present invention during manufacture, according to one method of the present invention.

FIGS. 5A, 5B, 5C, 5D, and 5E are cross-sectional side plan drawings of an apparatus according to an alternate embodiment of the present invention during manufacture, according to another method of the present invention.

FIG. 6A is a top plan drawing of an exemplary embodiment of the present Invention during laser ablation of cavity surface errors.

FIG. 6B is a cross-sectional side plan drawing of the exemplary embodiment of the present invention during laser ablation shown in FIG. 6A.

FIG. 6C is a cross-sectional side plan drawing of an alternative exemplary embodiment of the present invention during laser ablation shown in FIG. 6A.

FIGS. 12A, 12B, and 12C are schematic block diagrams illustrating an exemplary multi-position in situ diagnostics apparatus according to the present invention.

DETAILED DESCRIPTION OF THE INVENTION

Figure 1A:
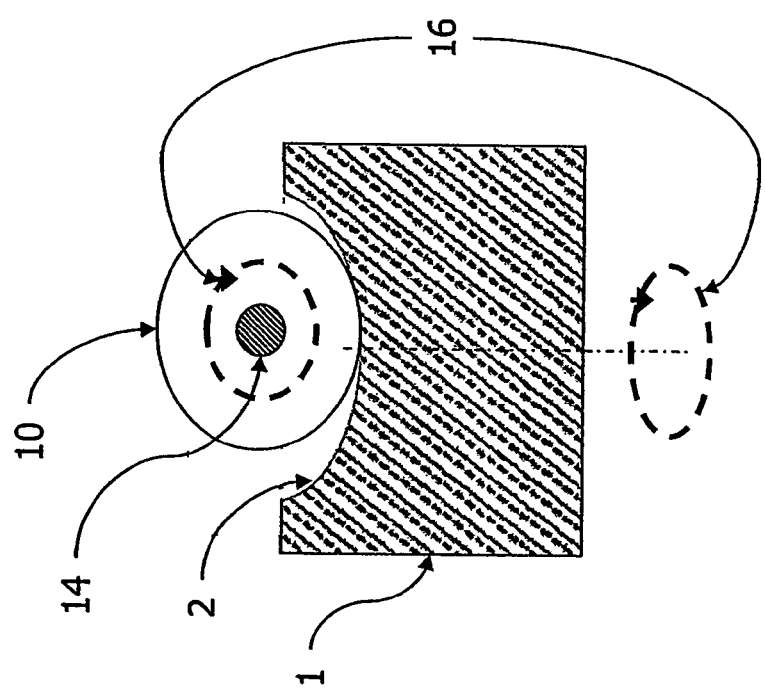
FIG. 1A (prior art) is a cross-sectional side plan drawing of a mold with a diamond grind wheel grinding a cavity therein.

One embodiment of the present invention is generally directed to laser ablation of undesirable features on a surface of a material to improve the shape match between the actual surface shape and a desired surface shape of the high precision surface of the material. These undesirable features may include such defects as tooling marks caused during turning or grinding processes used to form the initial surface shape. In a further embodiment, the material may be an optical mold, and the features may be undesirable surface undulations in the optical mold cavity. Those skilled in the art will recognize, however, that various other surfaces may be ablated for higher precision using one or more of the embodiments disclosed herein without departing from the present invention as defined in the claims.

Referring now to the drawing, in which like reference numbers refer to like elements throughout the various figures that comprise the drawing, FIG. 4 shows an exemplary embodiment of the present invention through several stages of manufacture. The step shown in FIG. 4A provides a block of mold material 41. Mold material 41 may generally be any hard material with desirably low thermal expansion, high heat conductance, oxidation resistance, and substantially low porosity, such as tungsten-carbide, a cermet (incorporating, for example, one or more of TiN, TiC, $Cr_2O_3$, and $Al_2O_3$), a ceramic (for example, $Al_2O_3$, $Cr_2O_3$, SiC, $ZrO_2$, $Si_3N_4$, TiN, TiC, or BN), a metal (such as Ni, Cr, Ti, W, Ta, Si, or alloy thereof), a solid state carbon material (such as diamond, amorphous diamond, or glassy carbon), glass, or sapphire.

Figure 1B:
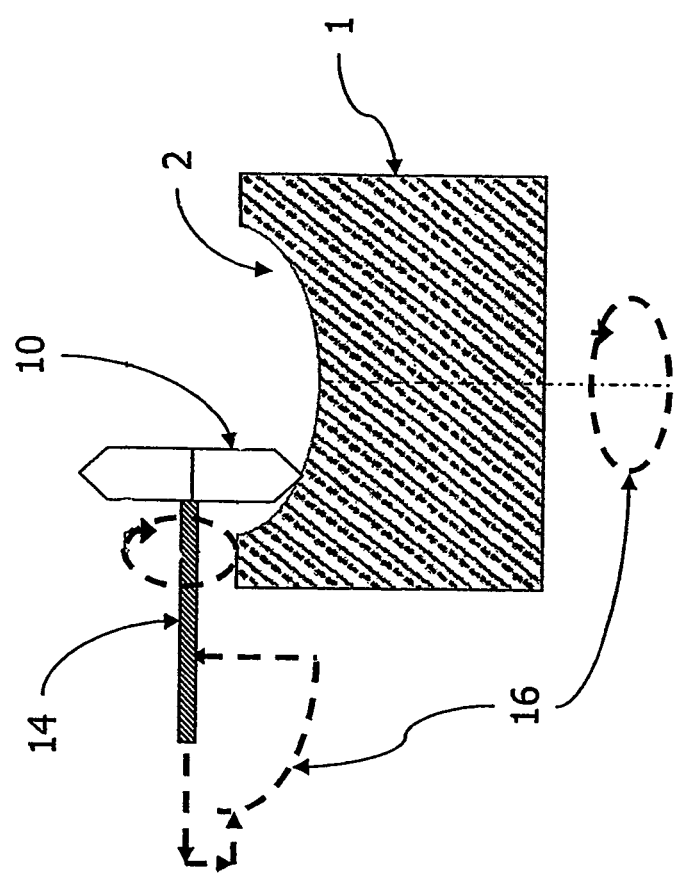
FIG. 1B (prior art) is a cross-sectional side plan drawing of a mold with a diamond grinding wheel grinding a cavity therein.
Figure 2:
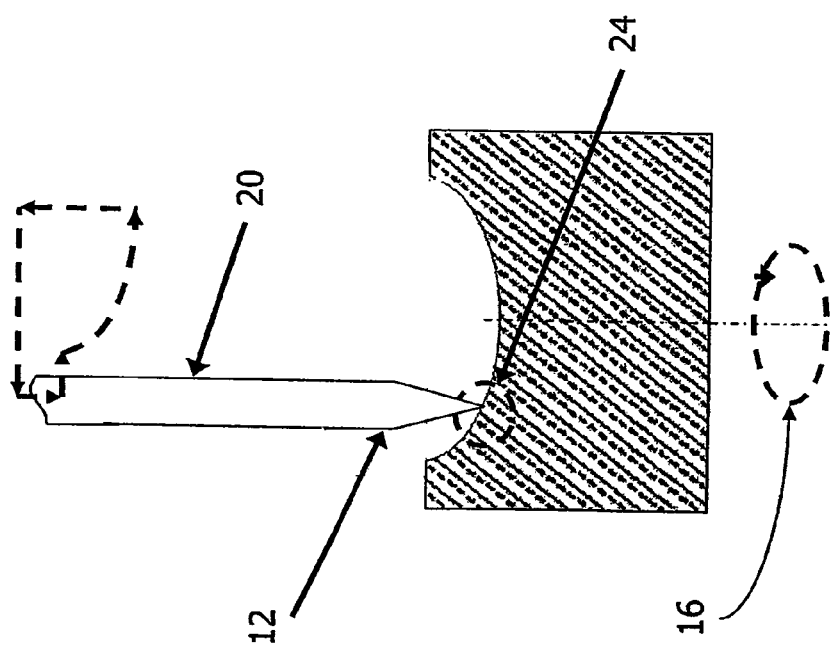
FIG. 2 (prior art) is a cross-sectional side plan drawing of a mold with a diamond turning point carving a cavity therein, further illustrating exemplary causes of surface cavity errors.
Figure 3B:
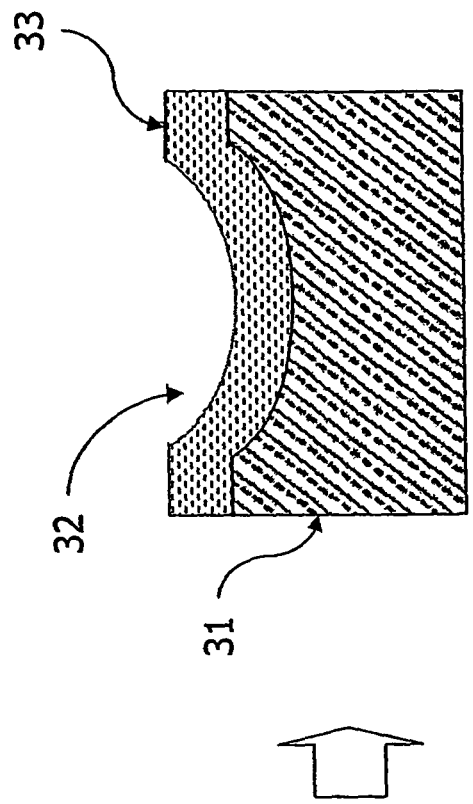
FIG. 3B (prior art) is a cross-sectional side plan drawing of the mold in FIG. 3A with a thin film formed thereon.
Figure 3A:
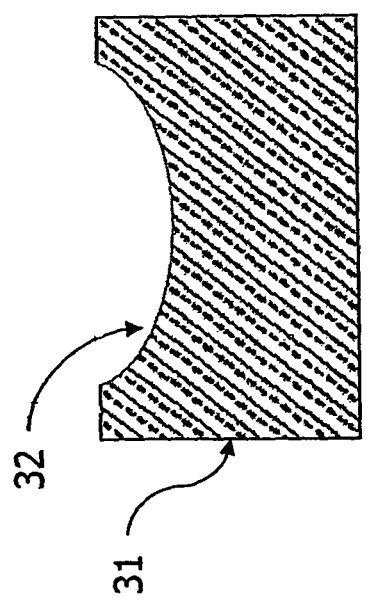
FIG. 3A (prior art) is a cross-sectional side plan drawing of a mold with a cavity formed therein.

Cavity 42 is then formed on a surface of mold material 41 according to one or more processes that may include, for example, the grinding/cutting process described with respect to FIGS. 1-3, and may also include one or more of ion beam milling, chemical etching, and plasma etching. Cavity 42 is desirably formed to substantially correspond to desired lens shape 40, with cavity surface errors 49 formed due to the imprecision of the prior art processes described above.

FIG. 4B shows the mold material 41 with cavity 42 formed therein and cavity surface errors 49 thereon, prior to a laser ablation process. Preceding the laser ablation process, cavity surface errors 49 are detected and measured with a high-precision detection device (not shown in FIG. 4), which may be, for example, a laser interferometer, white light interferometer, a linear variable displacement transducer, or any form of scanning probe microscopy (SPM), such as a scanning tunneling microscope (STM), an atomic force microscope (AFM), a near-field scanning optical microscope (NSOM), or a shear-force microscope (ShFM).

Generally, these errors are mold material that undesirably extends into the cavity away from a desired shape of the cavity (e.g. undulations over a desired shape). The high-precision detection device may map substantially all errors 49 on the surface of cavity 42. Following detection of errors 49, laser beam 45 is situated over a first one of the cavity surface errors 49, whereupon a laser source (not shown) Is activated to provide laser beam 45 which includes at least one pulse of light and desirably, a plurality of overlapping pulses, ablating the mold material extending into cavity 42 away from desired lens shape 40 and thereby correcting the error. Laser beam 45 Is then repositioned over a further one of the cavity surface errors 49 according to a predetermined algorithm, whereupon which the laser source is activated, desirably ablating the further error. This process is repeated until the surface of cavity 42 is refined to match the desired lens shape 40, as shown in FIG. 4C.

The laser source used to produce laser beam 45 may be any ultrafast short-pulse laser, such as a femtosecond laser or a picosecond laser. This laser source may desirably include any type of solid state gain medium typically used for laser machining applications, such as: Cr:YAG (peak fundamental wavelength, $\lambda_f$=1520 nm); Cr:Forsterite ($\lambda_f$=1230-1270 nm); Nd:YAG and Nd:YVO4 ($\lambda_f$=1064 nm); Nd:GdVO4 ($\lambda_f$=063 nm); Nd:YLF ($\lambda_f$=1047 nm and 1053 nm); Nd:glass ($\lambda_f$=1047-1087 nm); Yb:YAG ($\lambda_f$=1030nm); Cr:LiSAF ($\lambda_f$=826-876 nm); Ti:Sapphire ($\lambda_f$=760-820 nm); and Pr:YLF ($\lambda_f$=612 nm). These solid state gain media may be pumped using standard optical pumping systems such as flash lamp, erbium doped fiber lasers, and diode lasers, the output pulses of which may be directly coupled into the solid state gain medium or may undergo harmonic generation before being used to pump the solid state gain medium. The solid state gain medium (media) may be configured to operate as one or more of: a laser oscillator; a single pass amplifier; and/or a multiple pass amplifier. This element also includes optics to substantially collimate the laser light. The laser source may desirably produce nearly Fourier-transform limited pulses. An ultrafast laser source may be desired these pulses may have a duration of less than about 1 ns, typically less than 50 ps. The use of an ultrafast short-pulse laser for the ablation process desirably avoids thermal deformations of the mold cavity, and serves to remove the undesirable undulations by stripping the electrons of the irradiated atoms, essentially vaporizing the undulations with nanometer to sub-nanometer precision. Alternatively, the laser source may include an excimer laser system (e.g. XeCl, $\lambda_f$=308 nm; KrF, $\lambda_f$=248 nm; ArF, $\lambda_f$=193 nm; or $F_2$, $\lambda_f$=157 nm), a dye laser system (e.g. 7-diethylamino-4-methylcoumarin, $\lambda_f$=435-500 nm; benzoic acid, 2-[6-(ethylamino)-3-(ethylimino)-2,7-dimethyl-3H-xanthen-9-yl]-ethyl ester, monolhydrochloride, $\lambda_f$=555-625 nm; 4-dicyanmethylene-2-methyl-6-(p-dimethylaminostyryl)-4H -pyran, $\lambda_f$=598-710 nm; or 2-(6-(4-dimethylaminophenyl) -2,4-neopentylene-1,3,5-hexatrienyl)-3-methylbenzothiazolium perchlorate, $\lambda_f$=785-900 nm), or other laser system used in laser machining applications.

In order to prevent undesirable oxidation of the cavity surface, the laser, ablation process may be performed in an inert atmosphere. This inert atmosphere is selected to reduce the likelihood of oxidation of the mold surface during the laser ablation process and may include $N_2$ or a noble gas such as Ar. Alternatively, an assist gas such as: $N_2$, Ar, $O_2$, air, $CF_4$, Cl, $H_2$, or $SF_6$, may be used to assist in the ablation process by forming a plasma during laser illumination.

Prior to the ablation process described above, the laser may be calibrated for a particular material. The calibration process may include the steps of providing a block of the material, focusing the laser on a surface of the block of material, applying a pulse of light with a predetermined minimum power, and stepping up the power of the pulse of light until the surface of the material is desirably ablated to a certain depth (i.e., finding the ablation threshold). The ablation threshold power obtained in the calibration process may then be used in the ablation process of the present invention. In an exemplary embodiment, pulses having a power slightly greater than the ablation threshold are used to remove unwanted material from the mold.

The mold material 41 with cavity 42 substantially matching, for example, lens shape 40 described above, may be further processed to include a thin film material over cavity 42. As described above, with respect to FIG. 3, thin film 33 is desirably formed over the surface of at least the cavity 32 in order to prevent bonding of lens material (not shown in FIG. 3) to mold 31 in a mold pressing process for fabrication of an optical lens. As described above, thin film deposition according to the prior art may present undesirable thin film surface errors and undulations (not shown in FIG. 3), which may augment the underlying cavity surface errors, thereby presenting even larger surface undulations on the thin film surface. The application of thin film according to the present invention, however, may preclude the formation of such errors and undulations due to the improved shape accuracy of the laser processed mold cavity surface underlying the thin film.

In a further embodiment of the present invention, the thin film may be formed from a metal or alloy containing one or more of nickel, titanium, niobium, vanadium, molybdenum, platinum, palladium, iridium, rhodium, osmium, ruthenium, rhenium, tungsten, and tantalum, for example. Furthermore, the thin film may be applied using physical vapor deposition (PVD), chemical vapor deposition (CVD), molecular beam epitaxy (MBE), ion beam deposition, or electroplating. Generally, It is desirable that a thin film having predetermined thickness be applied to match features of the underlying surface, thereby matching a desired lens shape. In one embodiment, the predetermined thin film thickness may range from 1 to 5 microns, for example. Those skilled in the art will recognize that alternate thin film materials may be used for each particular application, depending on the optical lens material that is to be molded in that application. Alternately, the thin film may not be required, and may thus be omitted.

FIG. 5 shows an alternate embodiment of the present invention, in which the thin film is applied prior to the laser ablation process. In this embodiment, mold material 41 including cavity 42 with cavity surface errors 49 thereon is provided and a thin film of release material 53 is formed over at least a surface of the cavity 42. Thin film 53 may be formed using one or more of the processes described above. Inherent in the formation of thin film 53 is the formation of thin film cavity 52, having one or more thin film surface errors 59. Generally, these errors are caused by release material that undesirably extends into the thin film cavity away from a desired shape of the cavity (e.g. undulations over the desired concave shape). Thin film surface errors 59 may be formed due to the presence of cavity surface errors 49 underlying thin film 53, manufacturing imprecision, or any number of environmental conditions. It can be seen that the resulting thin film cavity 52 does not desirably conform to desired lens design 50.

Prior to correction of errors 59 in the thin film release layer 53, errors 59 may be detected and measured with a high-precision detection device (not shown in FIG. 5), which may be, for example, a laser interferometer, white light interferometer, a linear variable displacement transducer, or any form of scanning probe microscopy (SPM), such as a scanning tunneling microscope (STM), an atomic force microscope (AFM), a near-field scanning optical microscope (NSOM), or a shear-force microscope (ShFM). The high-precision detection device desirably may map substantially all errors 59 on the surface of thin film cavity 52. Following detection of errors 59, laser beam 55 is desirably situated over a first one of the thin film surface errors 59, whereupon which a laser source (not shown) is activated to produce laser beam 55 by releasing at least one pulse of light and, desirably, a plurality of overlapping pulses, ablating the release material extending into cavity 52 away from desired lens design 50 and thereby correcting the error. Laser beam 55 is then repositioned over a further one of the cavity surface errors 59 according to a predetermined algorithm, whereupon the laser source is activated, such that laser beam 55 may desirably ablate the further error. This process is repeated until thin film cavity 52 is refined to substantially remove identified surface errors, thereby matching cavity 52 to desired lens design 50, as shown in FIG. 5E. As described above, the laser source may generally be any ultrafast short-pulse laser, such as a femtosecond laser or a picosecond laser.

FIG. 6 illustrates a further embodiment of the present invention, where laser beam 65 is adjusted relative to the surface of mold cavity 42 such that a substantially normal angle of incidence is maintained as the surface of mold cavity 42 is moved according to an exemplary path algorithm 66 to desirably correct cavity surface errors 49 along its path. Alternately, laser beam 65 may generally be held at any desirable angle of incidence to the surface of mold cavity 42 as it is moved along its path. For example, laser beam 65 may be directed parallel to axis of rotation 60 of mold 41, as shown in FIG. 6C. In the exemplary embodiment illustrated in FIG. 6C, the polarization of laser beam 65 may be varied to reduce the potential of increasing surface roughness during the laser processing of the surface due to stimulated Woods anomalies.

FIG. 6A illustrates a top plan drawing of mold cavity 42 (shown as a declining gradient) with laser beam 65 (shown as a beam spot) moving along laser path 64, according to an exemplary path algorithm 66. Laser path 64 illustrates movement of the laser with progressively transparent phantom images of the beam spots of laser beam 65 along increasingly earlier points of its path in time. The progressively transparent phantom images of laser beam 65 may also indicate a desirable number of overlapping short-pulse beam emissions upon the mold cavity surface on any point along laser path 64. As illustrated in FIG. 6A, the laser may be swept in a desired path, wherein the laser is operated to emit short-pulses with a bite (circumferential distance between pulses) such that a desirable overlapping of regions ablated by consecutive pulses along the desired portion of the path occurs. The bite is typically selected to be less than or equal to ½ of the width of the region ablated by each pulse, desirably less than or equal to ⅓ of the width, or preferably less than or equal to ⅒ of the width.

In one embodiment of the invention, mold cavity 42 is substantially circularly symmetric, and laser beam 65 may be used to desirably correct errors in mold cavity 42 to substantially attain desired shape 40. It is noted that the errors in the surface shape may often be substantially circularly symmetric, particularly if the errors are tooling marks caused by either grinding or cutting the mold cavity. These tooling marks typically follow a spiral path with rings that are closely packed enough to approximate concentric circles. Therefore, correction of these errors may be accomplished by moving a beam spot of the laser beam 65 along a perimeter of the substantially circularly symmetric mold cavity 42 in one of a clockwise direction or a counterclockwise direction (such as along ablation path 64, for example) at a predetermined rate of spin. A laser source (not shown) may then be activated at a predetermined frequency to apply pulses of light as laser beam 65 along the perimeter of the cavity, wherein centers of ablated regions from consecutively applied pulses are separated by a predetermined circumferential distance. The predetermined circumferential distance is typically less than the diameter of the region ablated by laser beam 65 and may be ½ of the diameter of the ablation region or less for each pulse, for example. This ablation process may be repeated at the current perimeter of the mold cavity until the errors along the perimeter of the substantially circularly symmetric mold cavity are corrected. Then, either the mold or the beam spot of the laser may be moved radially by a predetermined radial distance to cause the beam spot to move around a new perimeter of the substantially circularly symmetric mold cavity. This new perimeter may be either a smaller perimeter or a larger perimeter. This process may be repeated until the errors in the mold cavity are desirably ablated.

In a further embodiment of the invention, the predetermined frequency of activating the laser source may be varied to a predetermined value for each perimeter in order to cause the predetermined circumferential distance between the centers of the ablated regions from consecutively applied pulses to remain substantially constant for each of the various perimeters. Alternately, the predetermined rate of spin of either the mold or the beam spot may be varied to a predetermined value for each perimeter in order to cause the predetermined circumferential distance between the centers of the ablated regions from consecutively applied pulses to remain substantially constant for each of the various perimeters.

In one embodiment of the present invention, exemplary path algorithm 66 dictates movement of laser beam 65 in the refining of the mold cavity surface shape. The exemplary path algorithm 66 shown in FIG. 6A, for example, moves laser beam 65 counterclockwise along an outer perimeter of the mold cavity. After at least one counterclockwise sweep, laser beam 65 is stepped downward to a closer perimeter of the mold cavity (i.e., closer to the center of the mold cavity) and the counterclockwise sweeping process is performed again. During the counterclockwise sweeps, laser beam 65 is selectively activated over cavity surface errors to desirably ablate the undulations, thereby correcting the errors. The process is repeated as necessary to desirably improve the surface shape of the mold cavity. In an alternate embodiment, the process described above may be performed with respect to a thin film cavity surface (not shown in FIG. 6) of a thin film applied over at least a surface of the mold cavity.

Figure 7:
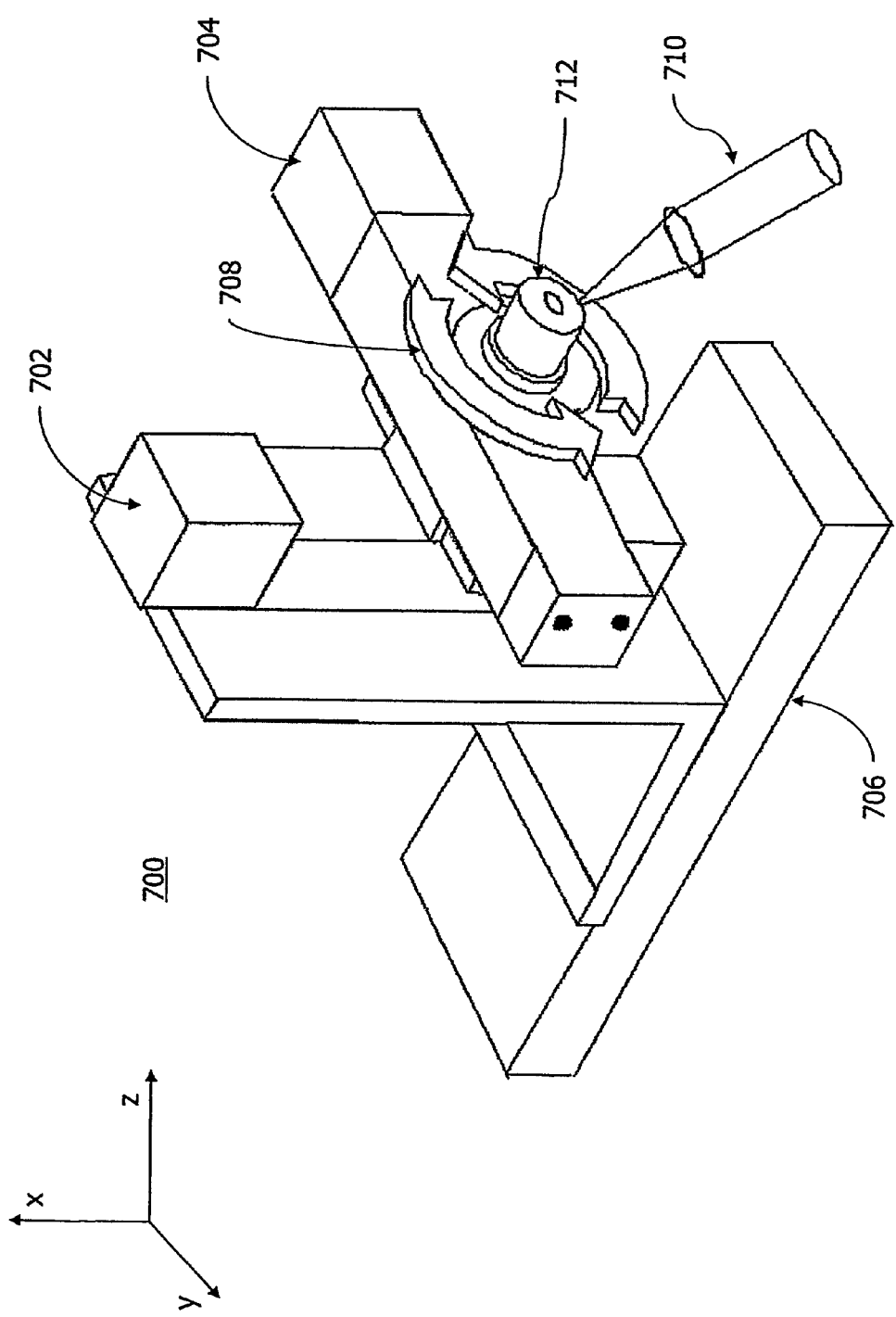
FIG. 7 is a perspective drawing of an exemplary motor-stage apparatus for performing the movement steps of the present invention.

FIG. 7 shows an exemplary motor apparatus 700 for carrying out the laser ablation algorithm of one embodiment of the present invention. Stages x-shift 702, y-shift 704, and z-shift 706 are brushless, coreless linear motor stages for moving optical mold 712 held by rotary-shift 708 to a desired location with respect to laser beam 710. Laser beam 710 may be aligned at an arbitrary $\phi$ angle in the cylindrical coordinate system having z as its radial axis. In one embodiment, $\phi$ may be set to any angle between nearly +90° and −90°. In another embodiment, $\phi$ may be dynamically altered throughout the ablation process so as to maintain a desirable alignment between laser beam 710 and the surface of mold 712.

The laser ablation process may begin once laser beam 710 and mold 712 are situated with respect to one another such that the surface of mold 712 is located at a distance substantially equal to the focus of laser beam 710. Rotary-shift 708 desirably rotates mold 712 at a predetermined rotational rate. As mold 712 is being rotated, laser 710 is selectively activated to pulse the surface of mold 712 such that the overlapping pulses ablate errors on the surface of mold 712. The pulse schedule is determined based on an average ablation per pulse figure and the size and location of undulations on the surface of mold 712, which are previously identified using a high-precision detection device. In one embodiment, a layer of approximately 0.1 nm-10 nm thickness of the surface is ablated by each pulse. As seen in FIG. 7, laser 710 may be positioned to apply pulses along a circular path with a certain radius from the center of the surface of mold 712. Once the surface errors have been ablated along this initial path, motor stage apparatus 700 may move mold 712 so that laser 712 now applies pulses along a circular path with a different radius from the center. Alternately, laser 710 may be moved to apply pulses at a different circular path radius. The process may be iterated until undulations on the surface of mold 712 have been desirably removed or minimized.

While the embodiments of the present invention as illustrated in the drawings show the mold and lens as being substantially horizontal, those skilled in the art will recognize that this is not a requirement of the invention. Generally, the mold or lens may be held at arbitrary $\Theta$ and $\phi$ angles in a cylindrical coordinate system. Further, they may be positioned to be substantially vertical so that debris ejected from the mold during the ablation process may fall away from the mold surface. Additionally, a jet of air may be blown across the mold such that debris is pushed away from the mold surface during ablation.

In one embodiment of the invention, the laser ablation process may take place In the presence of an assist gas, and/or while an assist gas is being blown over the surface of the mold cavity. In such an embodiment, selectively activating the laser as the laser beam passes over the undulations may apply pulses of light that chemically activate the assist gas over the undulations, thereby improving ablation of the errors in mold cavity. In further embodiments, this chemically activated ablation may correct errors on a surface of a thin film or lens. The assist gas may include at least one of $N_2$, Ar, $O_2$, air, $CF_4$, Cl, $H_2$, or $SF_6$, for example.

Figure 8:
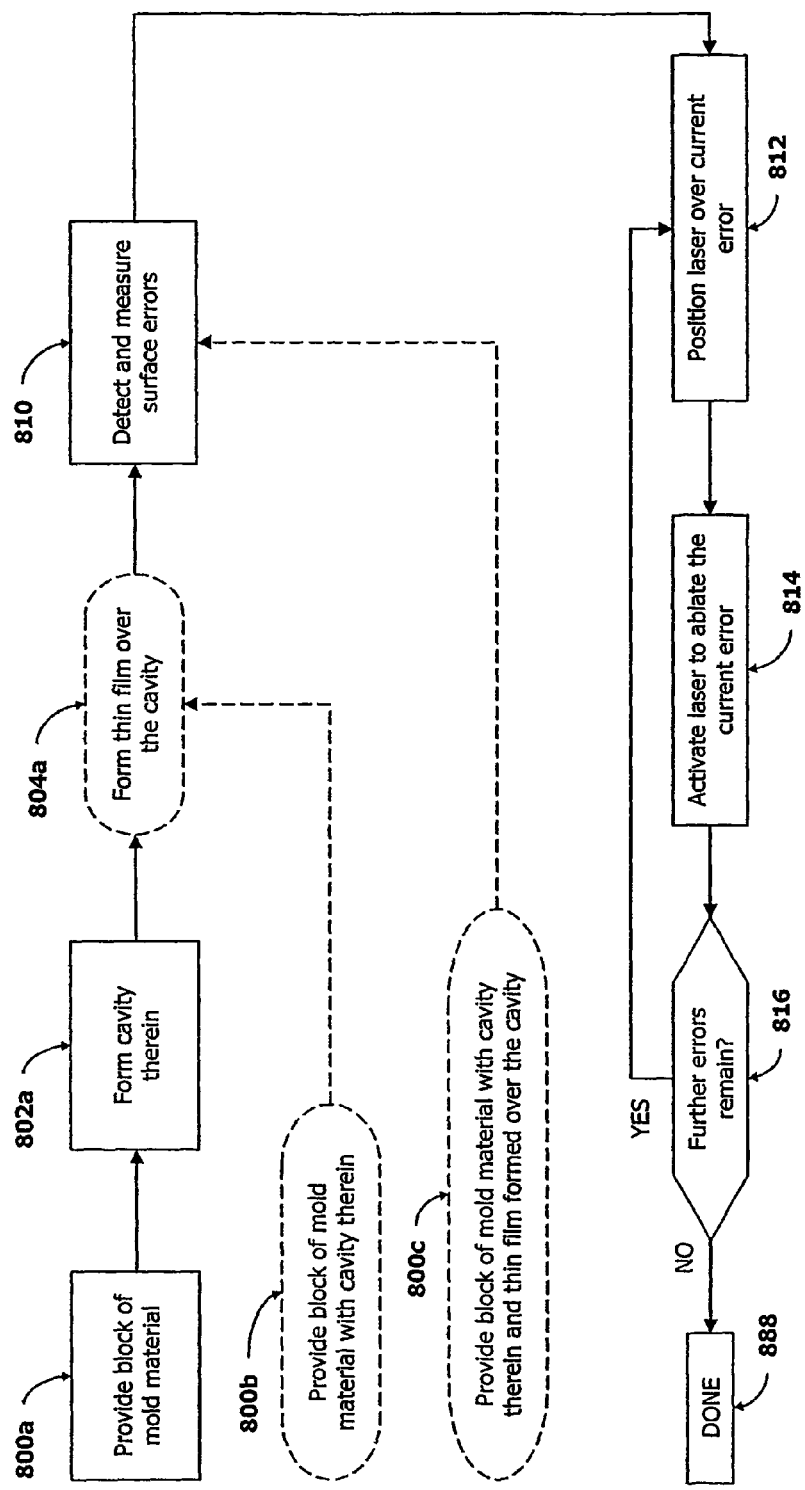
FIG. 8 is a flow chart showing an exemplary method of manufacture of an embodiment of the present invention.

FIG. 8 is a flow chart showing several exemplary methods of manufacture of an exemplary embodiment of the present invention. The exemplary alternative methods are illustrated using phantom process blocks and alternative process blocks in the flow chart. An actual assembly method would use one of the respective paths, without any decision blocks.

An exemplary process may begin In one of three ways as illustrated by steps 800a, 800b, and 800c, described below. Step 800a provides a block of mold material, Into which a cavity is formed In step 802a. The cavity is formed so that it substantially matches a desired lens shape. Step 800b, however, provides a block of mold material that already contains a cavity, thereby bypassing step 802a. In step 804a, a thin film may be formed over at least the cavity. This process is shown in phantom, as it may be omitted or performed subsequent to a "NO" condition at step 816 (not shown in FIG. 8). An alternate start step 800c provides a block of mold material that already contains a cavity and a thin film formed over the cavity.

Step 810 proceeds to detect and measure surface errors on a surface of the thin film or cavity, depending on which path is taken in previous steps. If a path is taken so that a thin film has been formed over the cavity, then step 810 detects and measures surface errors on the surface of the thin film. Whereas, if a path is taken so that no thin film has been formed over the cavity, step 810 detects and measures surface errors directly on a surface of the cavity. The errors being detected in step 810 generally represent undulations on a surface of the thin film or mold cavity signifying deviations from a desired lens design. Step 810 may also include steps to identify and partition the errors (for example, into a histogram or surface map of the cavity), listing the errors by their location and shape, and defining a desired pattern of laser pulses to correct each error.

Once step 810 has mapped errors on the surface of the thin film or mold cavity, step 812 positions the laser over a first identified error, which is designated as a current error. In this example, a surface error may be one or more adjacent undulations on a material surface that have a minimal path gap in between them. Step 814 activates the laser to emit at least one short pulse beam of light that desirably corrects the current error by ablating the undulation causing the error. Generally, Individual pulses may be applied, with multiple pulses being applied to ablate the surface error to a desired depth. Furthermore, as illustrated in FIG. 6A, the activation of the laser to emit at least one short pulse may be done in conjunction with moving the laser along a predetermined path pursuant to a predetermined algorithm so that, for example, selectively generated pulses may overlap in groups of 10 or more to ablate the surface errors. Step 816 determines whether any further errors remain on the surface of the thin film or mold cavity. If further errors exist, a next error is designated as the current error, and control transfers back to step 812, which positions the laser over the current error. Step 814 desirably ablates the current error, transferring control to step 816. This process is repeated until no further errors remain on the thin film or mold cavity, transferring control to a "DONE" condition 888, thereby signifying that the desirably high-precision, laser-refined mold has been completed. In a further embodiment, steps 812, 814, and 816 may be encompassed by step 810. In step 810, a complete laser ablation process may be defined by an algorithm Including information on the number of pulses required to correct each surface error, the precise locations of those errors, and a predetermined algorithm developed to efficiently remove the errors. The predetermined algorithm may be a laser movement schedule that moves the laser relative to the mold from a first error to a final error in a minimal number of moves and desirably corrects each surface error with 1 to 10 or more overlapping pulses of light. In an alternate embodiment, the predetermined algorithm may be a laser pulse schedule, where the optical mold is rotated according to the description with respect to FIG. 7, and the ultrafast laser is activated on a pulse schedule so as to desirably ablate the errors.

If step 804a was not taken to form a thin film over the mold cavity, then this process may be performed once refining of the mold cavity is completed and control has transferred to the step 888. In a further embodiment, it may be desirable to execute the above process from step 810 for a high-precision, laser-corrected mold, where a thin film is formed over the mold cavity, and steps 810-816 desirably ablate any errors introduced by the formation of the thin film.

Figure 9:
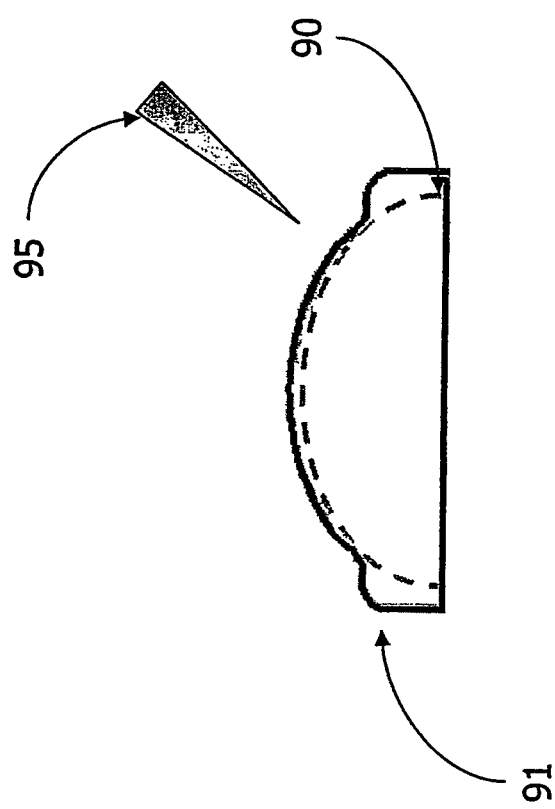
FIG. 9 is a cross-sectional side plan drawing of an alternate exemplary embodiment of the present invention during laser ablation.

In an alternate embodiment of the present invention, shown in FIG. 9, an optical lens 91 is provided. Optical lens 91 is formed according to a prior art process, and therefore has undesirable deviations from desired lens shape 90, the deviations being lens material extending from the surface of optical lens 91 away from desired lens shape 90. In the exemplary embodiment, a laser source (not shown) may be activated over one or more deviations from the desired lens shape 90 to produce laser beam 95 and ablate the lens material extending from the surface of optical lens 91 away from desired lens shape 90, thereby correcting the deviations and refining optical lens 91 to conform to desired lens shape 90. It may also be desirable to coat optical lens 91 with a substantially light absorptive temporary coating (not shown in FIG. 9) over at least the deviations thereon, where the light absorptive coating may desirably Increase absorption of a pulsed beam from laser beam 95.

Figure 10:
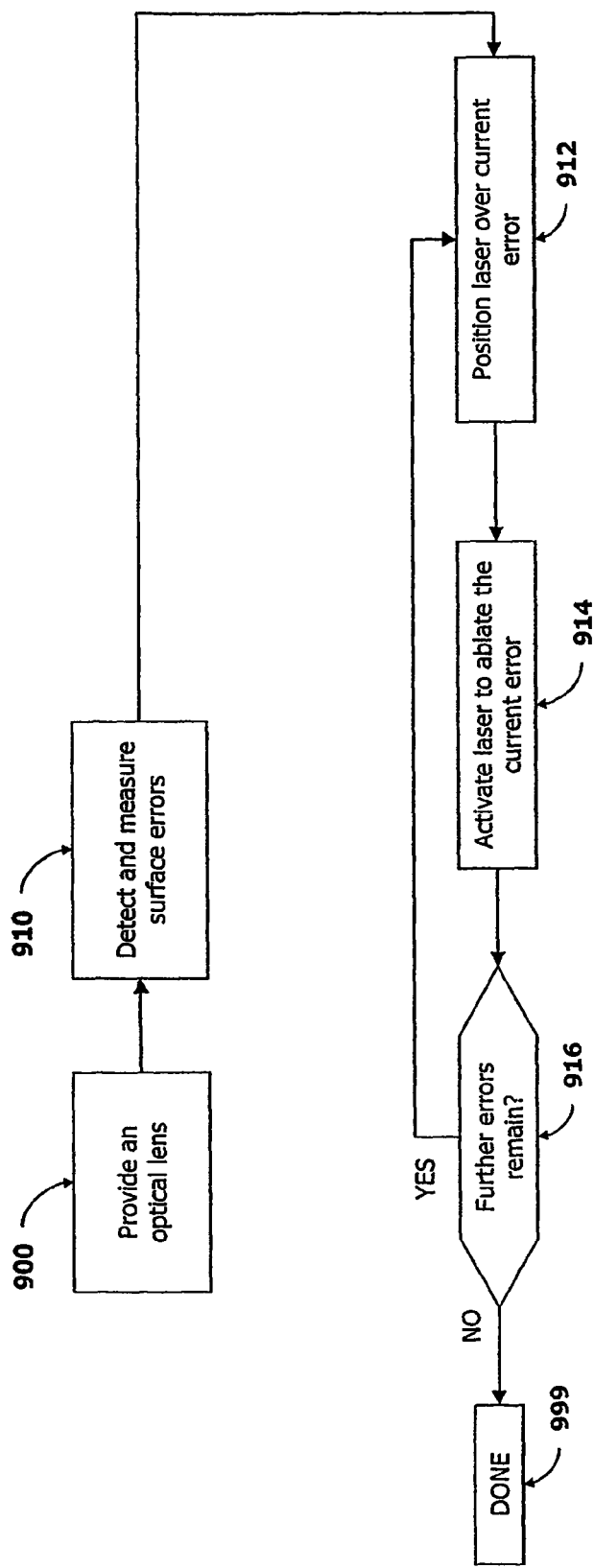
FIG. 10 is a flow chart showing an exemplary method of manufacture of an alternate embodiment of the present invention.

FIG. 10 is a flow chart showing an exemplary method of manufacture of an alternate embodiment of the present invention. In the present embodiment, an optical lens is directly refined using the laser ablation process described above, to desirably remove surface errors representing deviations from a desired lens shape. Step 900 provides an optical lens. Step 910 then detects and measures surface errors on the optical lens, where the surface errors may be undulations presenting undesirable deviations from a desired lens shape. Although not necessary, during this step, the optical lens surface errors may be coated with a substantially optically absorptive temporary film that may serve to desirably increase absorption of the laser beam used in the ablation process.

Once step 910 has mapped out errors on the surface of the optical lens, step 912 positions the laser over a first identified error, which is designated as a current error. Step 914 activates the laser to emit a short pulse beam of light that desirably ablates the current error. The laser activation step may generally be the same as that in step 814. Step 916 determines whether any further errors remain on the surface of the optical lens. If further errors exist, a next error is designated as the current error, and control transfers back to step 912, which positions the laser over the current error. Step 914 desirably ablates the current error, transferring control to step 916. This process is repeated until no further errors remain on the surface of the optical lens, transferring control to a "DONE" condition 999, thereby signifying that the high-precision, laser-refined optical lens has been completed. In a further embodiment, steps 912, 914, and 916 may be encompassed by step 910. In step 910, a complete laser ablation process may be defined by an algorithm including information on the number of pulses required to correct each surface error, the precise locations of those errors, and a predetermined algorithm to desirably ablate the errors. The predetermined algorithm may be a laser movement schedule that moves the laser from a first error to a final error in a minimal number of moves and desirably corrects each surface error with 1 to 10 or more overlapping pulses of light. In an alternate embodiment, the predetermined algorithm may be a laser pulse schedule, where the optical mold is rotated according to the description with respect to FIG. 7, and the ultrafast laser is activated on a determined pulse schedule so as to desirably ablate the errors.

Figure 11:
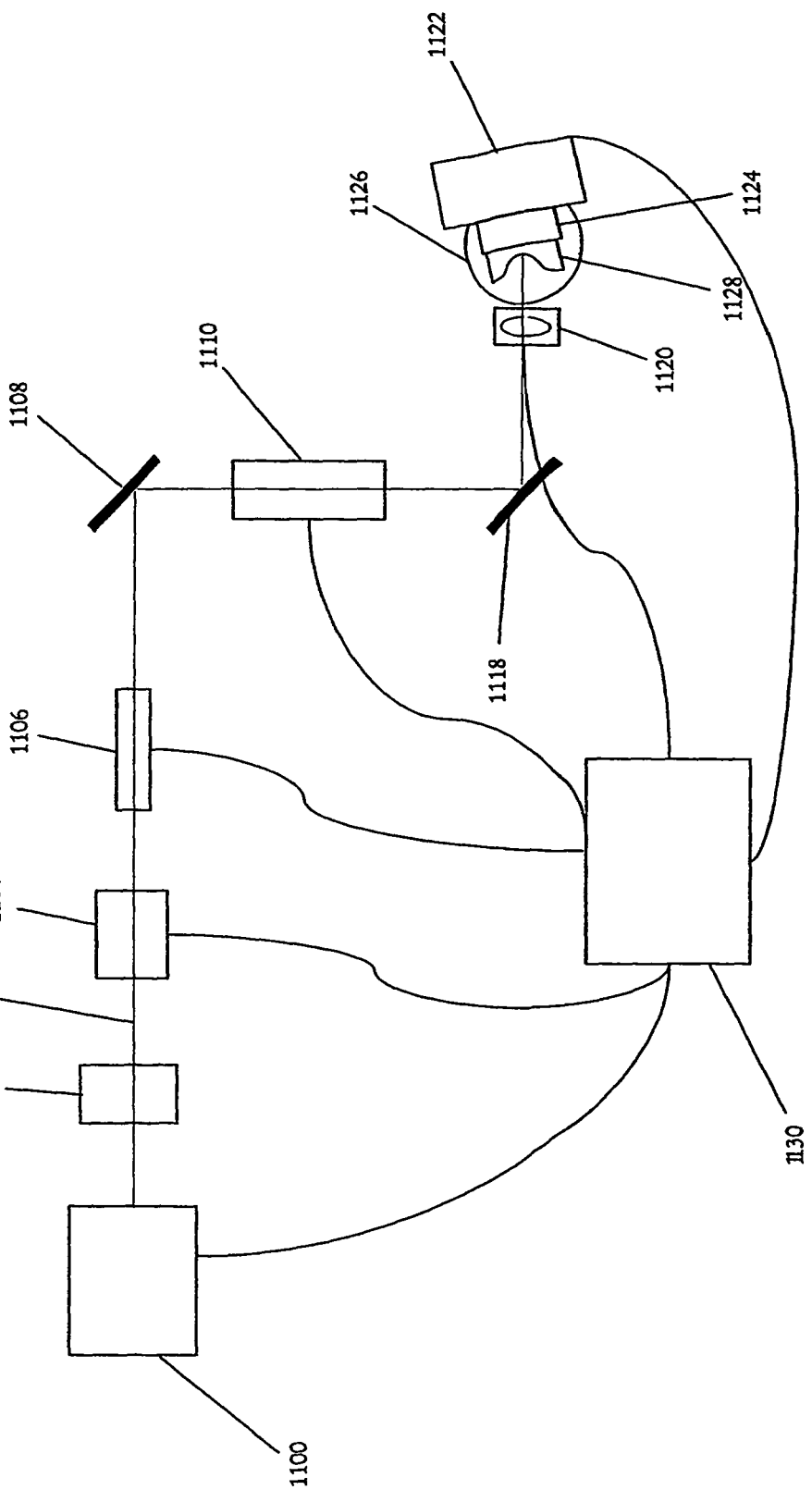
FIG. 11 is a schematic block diagram illustrating an exemplary laser machining system according to the present invention.

FIG. 11 illustrates a block diagram of an exemplary laser machining system that may be used with the exemplary methods of the present invention to improving the shape of a high-precision surface of device 1128. This exemplary system may desirably improve the surface shape by ablating device material from portions of the high-precision surface that deviate from a predetermined surface design shape.

This system includes pulsed laser source 1100 for generating a plurality of pulses of laser light that may be transmitted along beam path 1101. Laser source 1100 may be any ultrafast short-pulse laser, such as a femtosecond laser or a picosecond laser. This laser source may desirably include any type of solid state gain medium typically used for laser machining applications, such as: Cr:YAG (peak fundamental wavelength, $\lambda_f$=1520 nm); Cr:Forsterite ($\lambda_f$=1230-1270 nm); Nd:YAG and Nd:YVO4 ($\lambda_f$=1064 nm); Nd:GdVO4 ($\lambda_f$=1063 nm); Nd:YLF ($\lambda_f$=1047 nm and 1053 nm); Nd:glass ($\lambda_f$=1047-1087 nm); Yb:YAG ($\lambda_f$=1030 nm); Cr:LiSAF ($\lambda_f$=826-876 nm); Ti:Sapphire ($\lambda_f$=760-820 nm); and Pr:YLF ($\lambda_f$=612 nm). These solid state gain media may be pumped using standard optical pumping systems such as flash lamp, erbium doped fiber lasers, and diode lasers, the output pulses of which may be directly coupled into the solid state gain medium or may undergo harmonic generation before being used to pump the solid state gain medium. The solid state gain medium (media) may be configured to operate as one or more of: a laser oscillator; a single pass amplifier; and/or a multiple pass amplifier. This element also includes optics to substantially collimate the laser light.

Laser source 1100 may desirably produce nearly Fourier-transform limited pulses. An ultrafast laser source may be desired to produce pulses having a duration of, for example, less than about 1 ns, typically less than about 50 ps. The use of an ultrafast short-pulse laser for the ablation process desirably avoids thermal deformations of the mold cavity, and serves to remove the undesirable undulations by stripping the electrons of the irradiated atoms, essentially vaporizing the undulations with nanometer to sub-nanometer precision.

Alternatively, laser source 1100 may include an excimer laser system (e.g. XeCl, $\lambda_f$=308 nm; KrF, $\lambda_f$=248 nm; ArF, $\lambda_f$=193 nm; or $F_2$, $\lambda_f$=157 nm), a dye laser system (e.g. 7-diethylamino-4-methylcoumarin, $\lambda_f$=435-500 nm; benzoic acid, 2-[6-(ethylamino)-3-(ethylimino)-2,7-dimethyl-3H-xanthen-9-yl]-ethyl ester, monohydrochloride, $\lambda_f$=555-625 nm; 4-dicyanmethylene-2-methyl-6-(p-dimethylaminostyryl)-4H-pyran, $\lambda_f$=598-710 nm; or 2-(6-(4-dimethylaminophenyl) -2,4-neopentylene-1,3,5-hexatrienyl)-3-methylbenzothiazolium perchlorate, $\lambda_f$=785-900 nm), or other laser system used in laser machining applications.

Each pulse of laser light desirably has a predetermined peak wavelength. This peak wavelength is dependent on the gain medium of the laser oscillator used in laser source 1100. Additionally, laser oscillator 1100 may produce initial pulses of laser light having a fundamental peak wavelength, which is longer than the predetermined peak wavelength. Harmonic generation crystal 1102 may be included to generate pulses of laser light having the predetermined peak wavelength from the initial pulses of laser light generated by the laser oscillator.

Each pulse of laser light also desirably has a pulse energy equal to or slightly greater than a machining energy level. This machining energy level may be dependent on a number of factors, such as the beam spot size on the high-precision surface to be machined and the depth of material desired to be ablated with each pulse. It is noted that the desired pulse energy of the pulses may vary during the machining process. Although the pulse energy of pulses generated by laser source 1100 may be directly adjusted, this may lead to undesirable shifts in the peak wavelength, pulse width, or other parameter associated with the laser pulses. Therefore, to allow control of the pulse energy, it may be desirable to have a pulsed laser oscillator that produces the pulses of laser light having a predetermined initial pulse energy, which is equal to the maximum desired pulse energy. The pulse energy of these initial pulses may then be controlled by variable attenuator 1106, which is coupled to processor 1130 to control the pulse energy of the pulses of laser light, even as the machining energy level varies.

Variable attenuator 1106 desirably allows for fine control of the pulse energies, and thus the beam fluence. Variable attenuator 1106 is desirably a polarization type of controllable variable attenuator that may withstand the high peak powers associated with ultrafast lasers. For example a pair of linear polarizing members arranged on either side of a controllable polarization rotation element such as a Pockels cell, Kerr cell, or a liquid crystal. Alternatively, a fixed linear polarizing member and a rotatable polarization member may be used as variable attenuator 1106.

The pulses of laser light are desirably generated by pulsed laser source 1100 with a constant repetition rate. The higher the repetition rate the more quickly the laser machining system may operate, but this also increases the duty cycle and heat dissipation of laser source 1100 and other system components as well. The repetition rate is desirably at least about 1 kHz, though a higher repetition rate of 20 kHz or more is contemplated.

Although laser source 1100 desirably operates at constant repetition rate, it may be desirable for the high-precision surface to be machined at a non-constant rate. Therefore, shutter 1104 is aligned in beam path 1101 of the pulses of laser light. Desirably, shutter 1104 may include a mechanical shutter to allow the beam to be blocked 1) during realignments of device 1128 to allow other portions of the high-precision surface to be machine or 2) while device 1128 is removed and a new device mounted on five-axis device mount 1122. It is noted that a mechanical chopper may be used to reduce the number of pulses transmitted through shutter 1104 to irradiate the high-precision surface of device 1128.

Alternatively, shutter 1104 may include a high speed electro-optical pulse picker. Such a pulse picker may desirably have a switching time less than the inverse of the repetition rate of the pulses of laser light generated by laser source 1100. A switching time of this duration may allow individual pulses from the plurality of pulses generated by laser source 1100 to be selectively transmitted or blocked by shutter 1104. This selectively transmission of pulses by shutter 1104 may be responsive to signals from processor 1130. These pulse picking signals may be generated by processor 1130 based on the position of the beam spot on the high-precision surface as monitored by sensors in five axis device mount 1122. The operation of these sensors is described below in detail.

The high speed electro-optical pulse picker may be based on one of a number of electro-optical devices, including: a Pockels cell; a Mach-Zehnder interferometer; a Kerr cell; a liquid crystal; or an electroabsorption cell. The high peak power of ultrafast laser pulses may pose problems for many of these devices, leading to difficulties, such as high current densities in an electroabsorption cell based pulse picker and excessive heating in a liquid crystal based pulse picker. These exemplary difficulties may be overcome by enlarging the electroabsorption cell or using multiple polarizing layers to absorb the pulse energy. The potential need for rapid switching between a transmission state and a blocking state may cause additional difficulties for these exemplary high speed electro-optical pulse picker, particularly for picking pulses from high repetition rate (<20 kHz) laser sources. High speed circuitry, having a low inductance and possibly involving the use of a number of capacitors that may be charged and discharged sequentially, may be used to provide the electrical signals necessary to operate these exemplary high speed electro-optical pulse pickers.

While such a high speed electro-optical pulse picker may be used to transmit arbitrary pulse trains from the periodic pulses generated by the laser source, it may be desirable to use a high speed electro-optical pulse picker to selectively transmit every $n^{th}$ pulse, where n is a positive integer, while blocking the other pulses. This creates an effective repetition rate of pulses of laser light irradiating the high-precision surface, which is equal to the repetition rate of the laser source divided by n. For example, this may be particularly desirable for machining circularly symmetric surfaces, where lower repetition rates may be desirable as the beam spot scans rings with shorter radii. As describe above, it may be desirable for the scan rate of the beam spot over the high-precision surface to be less than one half of the diameter of the beam spot times the effective repetition rate with which pulses of laser light irradiate the high-precision surface, or preferably less than one tenth of the beam spot diameter times the effective repetition rate, but slower scan speeds may lead to excessive ablation from irradiating the same location too many times. Thus, near the center of a circular symmetric surface, circular scans may require unreasonable high rotational speeds, unless the repetition rate is lowered. Processor 1130 may be used to control the high speed electro-optical pulse picker to match the repetition rate to the radial distance from the center of the circularly symmetric high precision surface, so that the rotational speed of spindle 1124 may be maintained in a desired range. Another method avoid over ablation near the center of a circularly symmetric high precision surface is for processor 1130 control the diameter of the beam spot such that the scan rate of the beam spot over the high-precision surface is less than one half of the diameter of the beam spot times the effective repetition rate with which pulses of laser light irradiate the high-precision surface. The diameter of the beam spot may be controlled by adjusting objective lens 1120 or by using five axis device mount 1122 to move device 1128 to different focal positions of objective lens 1120.

The exemplary laser machining system of FIG. 11 may also include polarization control means 1110 aligned in the beam path to control a polarization of the plurality of pulses of laser light. Polarization control means may desirably control the polarization of the pulses of laser light such that the pulses are substantially circularly polarized in the beam spot, or may allow for control of the polarization to allow various elliptic polarizations.

It is noted that variable attenuator 1106 desirably produces laser light linearly polarized in a known direction. This is because linearly polarized light is desirable as the input light for polarization control means 1110, which may, for example, include a quarter wave plate (possibly rotatable) and may include a linear polarization rotator as well. Although this exemplary polarization control means uses linearly polarized input light, it may be understood by one skilled in the art that input light having other polarizations may be used, as long as the polarization of the input light is known, with minor changes to the elements of polarization control system. It is also noted that a fixed linear polarizer (not shown) may be added.

A linear polarization rotator, such as a controllable polarization rotation element that functions as a rotatable half wave plate, may be used to controllably rotate the polarization direction of the laser pulses transmitted by variable attenuator 1106 to a desired angle. This linear polarization rotator may desirable be a half wave plate that may be physically rotated or may be an electro-optical device, such as a Pockels cell, a Kerr cell, or a liquid crystal that may rotate the polarization direction of light a controlled amount based on an applied electric field. A rotatable quarter wave plate may then transform the polarization of the pulses of laser light to have an elliptical polarization. Alternatively, a stationary quarter wave plate may be used alone to transform the polarization of the pulses of laser light to a circular polarization.

Various optics, such as steering mirrors 1108 and 1118 and objective lens 1120 are aligned in the beam path to direct and focus the pulses of laser light to a beam spot on the high-precision surface of device 1128. Objective lens 1120 may be part of exemplary multi-position in situ diagnostics apparatus 1200 illustrated in FIGS. 12A, 12B, and 12C.

Exemplary multi-position in situ diagnostics apparatus 1200 includes multi-position in situ diagnostics shuttle 1202 with objective lens 1120, forward-facing beam alignment camera 1204, and backward-facing beam quality camera 1206 mounted on multi-position in situ diagnostics shuttle 1202. Forward-facing beam alignment camera 1204 is desirably a CCD camera having adequate resolution to image features ablated on the high-precision surface by the pulses of laser light, and backward-facing beam quality camera 1206 is desirably a CCD camera capable of providing cross-sectional images of the spatial mode structure of the pulses. Backward-facing beam quality camera 1206 may include a narrow band filter to improve the quality of its spatial mode structure images.

In situ diagnostics shuttle 1202 may desirably be a linear motion stage designed to repeatably stop at specific positions. FIGS. 12A, 12B, and 12C illustrate exemplary multi-position in situ diagnostics apparatus 1200 in its three positions, i.e. the first shuttle position (FIG. 12A), the second shuttle position (FIG. 12B), and the third shuttle position (FIG. 12C). Each of the three components mounted on in situ diagnostics shuttle 1202 may be brought into alignment with beam path 1101 in one of these positions.

FIG. 12A illustrates in situ diagnostics shuttle 1202 in the first shuttle position, in which objective lens 1120 is aligned in beam path 1101 to focus the plurality of pulses of laser light to the beam spot.

FIG. 12B illustrates in situ diagnostics shuttle 1202 in the second shuttle position, in which forward-facing beam alignment camera 1204 is aligned collinear to beam path 1101 so that it may image reflected light 1208 from an ablated area on the high precision surface of the device corresponding to the location of the beam spot when the multi-position in situ diagnostics shuttle is in the first position. This allows forward-facing beam alignment camera 1204 to produce an alignment image that matches the area to be irradiated. Processor 1130 may then determine the initial beam alignment based on this alignment image. This alignment information allows processor 1130 to control shutter 1104 and five axis device mount 1122 to select specific areas of the high-precision surface to irradiate with laser pulses. It is noted that it may not be desirable for pulses to be transmitted along beam path 1101 when situ diagnostics shuttle 1202 is in the second shuttle position. A beam stop (not shown) may be provided on situ diagnostics shuttle 1202 opposite forward-facing beam alignment camera 1204 to prevent damage to forward-facing beam alignment camera 1204 if pulses are transmitted along beam path 1101 when situ diagnostics shuttle 1202 is in the second shuttle position.

FIG. 12C illustrates in situ diagnostics shuttle 1202 in the third shuttle position, in which backward-facing beam quality camera 1206 is aligned collinear to beam path 1101 to image a cross-section of the pulses of laser light that may be used to determine beam quality.

It is noted that objective lens 1120, forward-facing beam alignment camera 1204, and backward-facing beam quality camera 1206 may desirably be mounted in a row on multi-position in situ diagnostics shuttle 1202 along a shuttle translation line, as shown in FIGS. 12A, 12B, and 12C. In this exemplary embodiment, multi-position in situ diagnostics shuttle 1202 moves between the shuttle positions by translating along the shuttle translation line. Desirably, the shuttle translation line is aligned substantially perpendicular to beam path 1101 and substantially parallel to the Θ axis of Θ rotational stage 1126 of device mount 1120, as shown in FIG. 11. This orientation allows Θ rotational stage 1126 the greatest range of motion without being obstructed by multi-position in situ diagnostics shuttle 1202. Alternatively they may be mounted at in a circular arc and rotated into position.

It is also contemplated that multi-position in situ diagnostics apparatus 1200 may include: an XY lens translation stage (not shown), coupling objective lens 1120 to in situ diagnostics shuttle 1202, to align the axis of beam path 1101 with the center of objective lens 1120 when in the first shuttle position; an XY camera translation stage (not shown), coupling forward-facing beam alignment camera 1204 to in situ diagnostics shuttle 1202, to align the axis of beam path 1101 with the center of forward-facing beam alignment camera 1204 when in the second shuttle position; and an XY camera translation stage (not shown), coupling backward-facing beam quality camera 1206 to in situ diagnostics shuttle 1202, to align the axis of beam path 1101 with the center of backward-facing beam quality camera 1206 when in the third shuttle position.

The exemplary laser machining system of FIG. 11 also includes five axis device mount 1122 to hold and controllably move device 1128 such that the beam spot may be scanned over its high-precision surface. Five axis device mount 1122 may be arranged similarly to exemplary motor apparatus 700 illustrate in FIG. 7 and described in detail above. Five axis device mount 1122 desirably has motion stages to control motion of device 1128 in five axes: three orthogonal linear translation stages; Θ rotational stage 1126, which may be coupled to the three orthogonal linear translation stages, to rotate the device about a Θ axis orthogonal to beam path 1101; and φ rotational stage 1124, coupled to Θ rotational stage 1126, to rotate the device about a φ axis which Is orthogonal to the Θ axis and varies as the Θ rotational stage Is rotated. A holder (not shown) coupled to φ rotational stage 1124 to hold device 1128 is also provided in five axis device mount 1122.

It is noted that Θ rotational stage 1126 may allow rotation of device 1128 through an angle of substantially 180°. This angle may be reduced depending on the space required for objective lens 1120 (or multi-position in situ diagnostics apparatus 1200).

In an exemplary embodiment, φ rotational stage 1124 may be a spindle motion stage as shown in FIG. 11. Processor 1130 may control this spindle motion stage to rotate device 1128 about the φ axis at a substantially constant angular rate. As described above, the constant angular rate is desirably such that the scan rate of the beam spot over the high-precision surface is less than one half of the diameter of the beam spot times a repetition rate with which pulses of laser light irradiate the high-precision surface.

In another exemplary embodiment of the present invention each of the three orthogonal linear translation stages may include a linear position sensor to sense the linear position of the corresponding linear translation stage, Θ rotational stage 1126 includes a Θ position sensor electrically coupled to the processor to sense its Θ position; and φ rotational stage 1124 includes a φ position sensor electrically coupled to the processor to sense its φ position. All five of the position sensors are electrically coupled to processor 1130. Processor 1130 may determine the scan location of the beam spot on the high-precision surface based on the predetermined surface design shape, the three orthogonal linear positions sensed by the three linear position sensors, the Θ position sensed by the Θ position sensor, the φ position sensed by the φ position sensor, and, if it has been measured, the initial beam alignment. Processor 1130 may also determine the angle of incidence of the pulses of laser light with the high-precision surface from this data.

Processor 1130, which may include at least one of: a general purpose computer; a digital signal processor; special purpose circuitry; and/or an application specific integrated circuit, may use this information to control a number of parameters of the laser machining process.

Exemplary parameters that processor 1130 controls may include: the pulse energy of the pulses of laser light; the diameter of the beam spot; the pulse train of the pulses transmitted by shutter 1104; which portions of the high-precision surface are scanned; the scan rate; and the polarization of the pulses of laser light. In one exemplary embodiment, the pulse energy of the pulses of laser light at a machining energy level and a diameter of the beam spot such that each pulse of laser light ablates an ablation depth of device material from the high-precision surface. Desirably, the ablation depth may be in the range of about 0.01 μm to 10 μm. Smaller ablation depths may improve the shape form accuracy of the high-precision surface, but larger ablation depths allow for more rapid removal of large surface errors. The processor may be used to reduce the ablation depth depending of the deviation of the high-precision surface from the desired shape form.

Shutter 1104 and five axis device mount 1122 may be controlled in tandem such that predominantly only the portions of the high-precision surface that deviate from the predetermined surface design shape are irradiated by the laser pulses. Desirably shutter 1104 includes a high speed electro-optical pulse picker that processor 1130 may control to: selectively transmit individual pulses or groups of pulses of laser light when the scan location is on one of the portions of the high-precision surface that deviates from the predetermined surface design shape; and block pulses when the scan location is on other portions of the high-precision surface.

In one exemplary embodiment, processor 1130 may be used to control the motion stages of five axis device mount 1122 to maintain the angle of incidence on the pulses on the high-precision surface at substantially 0° (i.e. normal to the surface) as the beam spot is scanned over the portions of the high-precision surface that deviate from the predetermined surface design shape.

In another exemplary embodiment, the angle of incidence is allowed to vary and processor 1130 controls polarization control means 1110 to adjust the polarization of the pulses of laser light. The polarization of the pulses of laser light may be adjusted such that the pulses are elliptically polarized in the beam spot with a major polarization axis orientation and an ellipticity of the polarization selected to reduce stimulated Wood anomalies from ablation of the high-precision surface based on the angle of incidence.

Figure 13:
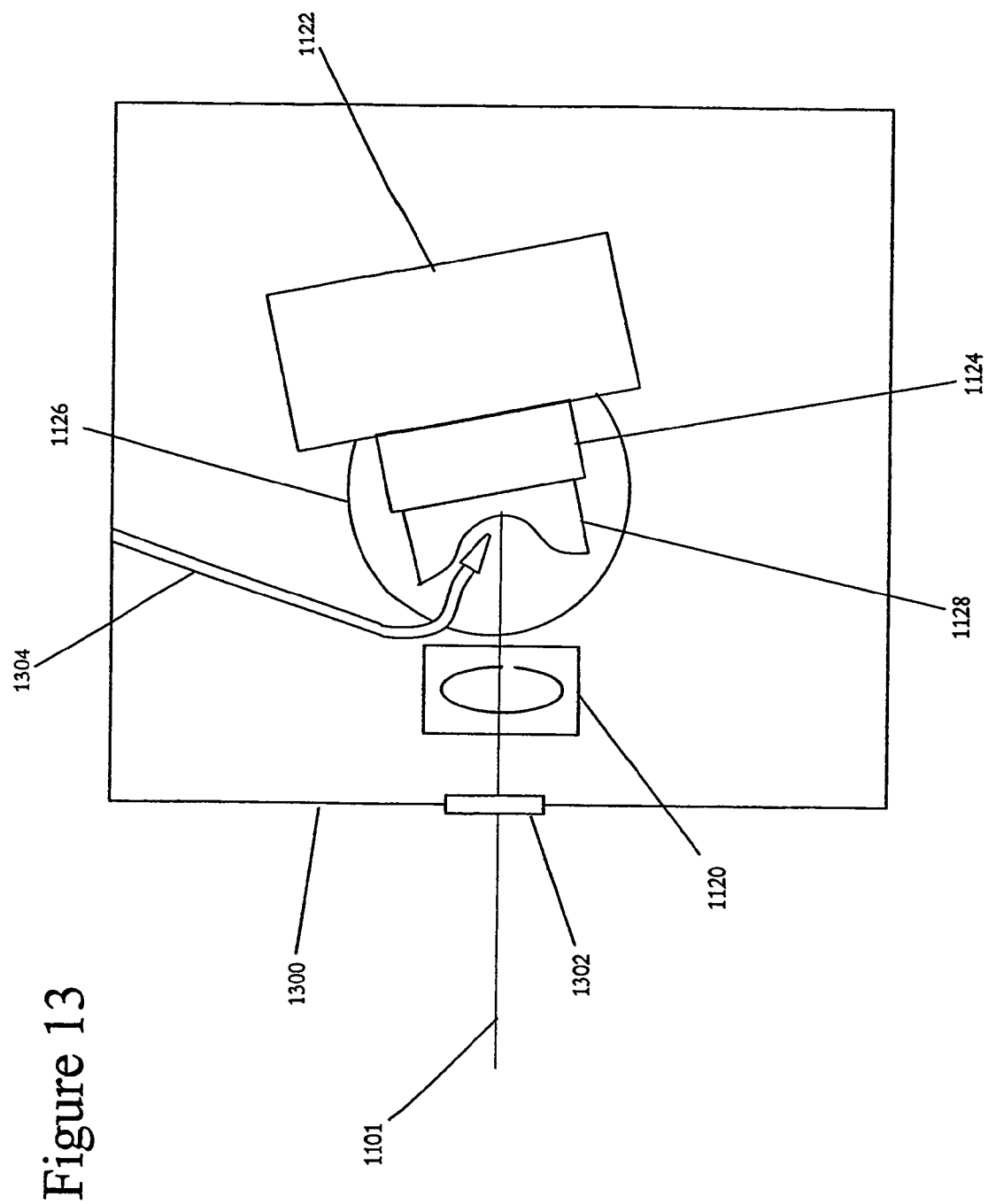
FIG. 13 is a schematic block diagram illustrating an exemplary assist gas chamber according to the present invention.

The exemplary laser machining system may also include an assist gas chamber enclosing device mount 1122 and/or an assist gas jet to blow assist gas over the high-precision surface. The use of such assist gasses may be useful in laser machining process as described above. FIG. 13 illustrates exemplary assist gas chamber 1300, which Is shown as surrounding both device mount 1122 and objective lens 1120, as well as assist gas jet 1304. Exemplary assist gas chamber 1300 includes transparent window 1302 aligned with beam path 1101 to transmit the pulses of laser light.

Figure 14:
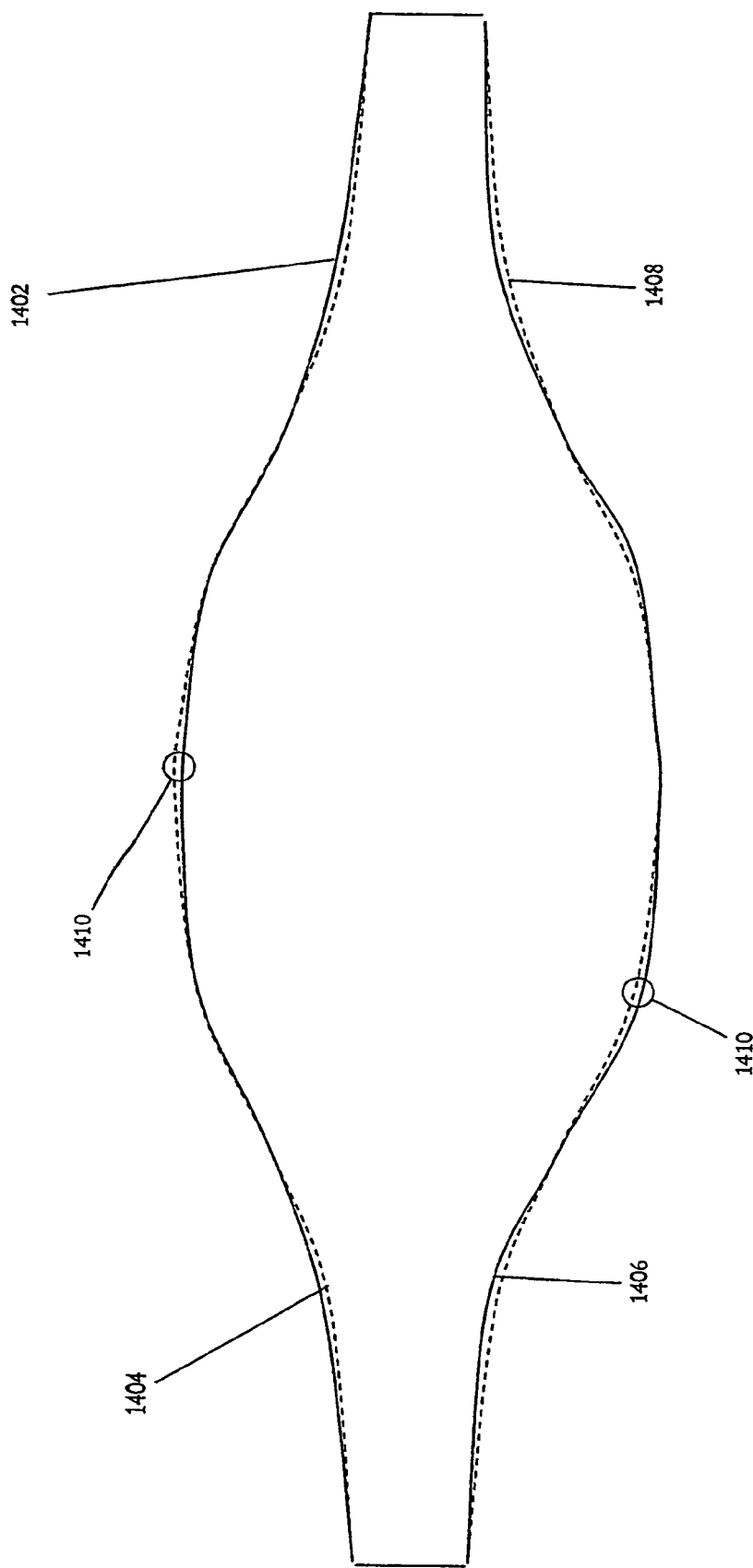
FIG. 14 is a side plan drawing illustrating an exemplary improved aspherical lens according to the present invention.

FIG. 14 Illustrates exemplary improved aspherical lens 1400 for use with short wavelength light. High-precision surfaces 1402 and 1406 of improved aspherical lens 1400 may be formed using the exemplary system of FIG. 11 and the exemplary methods described above. This exemplary lens may be formed of a lens material, such as glass, sapphire, plastic, or a combination thereof. The two light refracting surfaces 1402 and 1406 of aspherical lens 1400 desirably have surface shapes that match respective predetermined surface design shapes (shown as dashed lines 1404 and 1408) with a maximum deviation of less than about 1 μm, desirably less than about 0.1 μm, and preferably less than about 0.05 μm. These deviations being measured normal to the desired surface. Circles 1410 illustrate two exemplary deviations of the light refracting surfaces 1402 and 1406 from their respective predetermined surface design shapes that may remain in a completed exemplary lens. It is noted that these deviations are not drawn to scale for illustrative purposes.

An exemplary aspherical lens may be formed by directly machining the lens material to form the two light refracting surfaces of the lens. Alternatively, such exemplary lenses may be mass produced using compression molds that have been machined to match the desired lens surfaces. Prior art methods to form these surfaces, such as mechanically grinding or cutting the surfaces, are described above with reference to FIGS. 1A, 1B, and 2. These prior art methods leave spiral tooling marks on the surface that deviate from the desired surface shape form. Additionally as describe above vibrations of the shaft and other problems during mechanical processing of the surface may lead to other less regular surface shape deviations. The magnitude of these tooling mark deviations may be undesirably large, e.g. on the order of 100 μm. Careful grinding or cutting of the surface may reduce the magnitude of these tooling marks, as may possible additional mechanical polishing processes, but reduction of these tooling marks such that the maximum deviation of the surface shape from the surface design form is 0.2 μm or less may prove difficult. In the case of short wavelength lenses and compression molds to form these lenses, deviations of 0.2 μm, particularly in a periodic pattern, may lead to undesirable diffraction and scattering of the short wavelength light.

Mechanical polishing and other mechanical processing steps may lead to other mechanical processing marks in addition to tooling marks. These other mechanical processing marks may include scratches, radial marks, and cross-hatched marks depending on the types of mechanical processing and/or polishing performed. The exemplary laser machining methods of the present invention allow for the reduction of all of these varieties of mechanical processing marks, including tooling marks. Desirably, these exemplary laser machining methods may leave, at most, traces of the mechanical processing marks that deviate from the desired surface shape form by less that 1 μm, desirably less that 1 μm, preferably less than 0.05 μm.

Exemplary aspherical lens may have other deviations due to material defects and/or processing that may be reduced using the exemplary methods of the present Invention as well.

Although both exemplary light refracting surfaces 1402 and 1406 are shown as having an aspherical shape in FIG. 14, it may be understood by one skilled in the art that an aspherical lens may be formed with only one aspherical light refracting surface.

Figure 15:
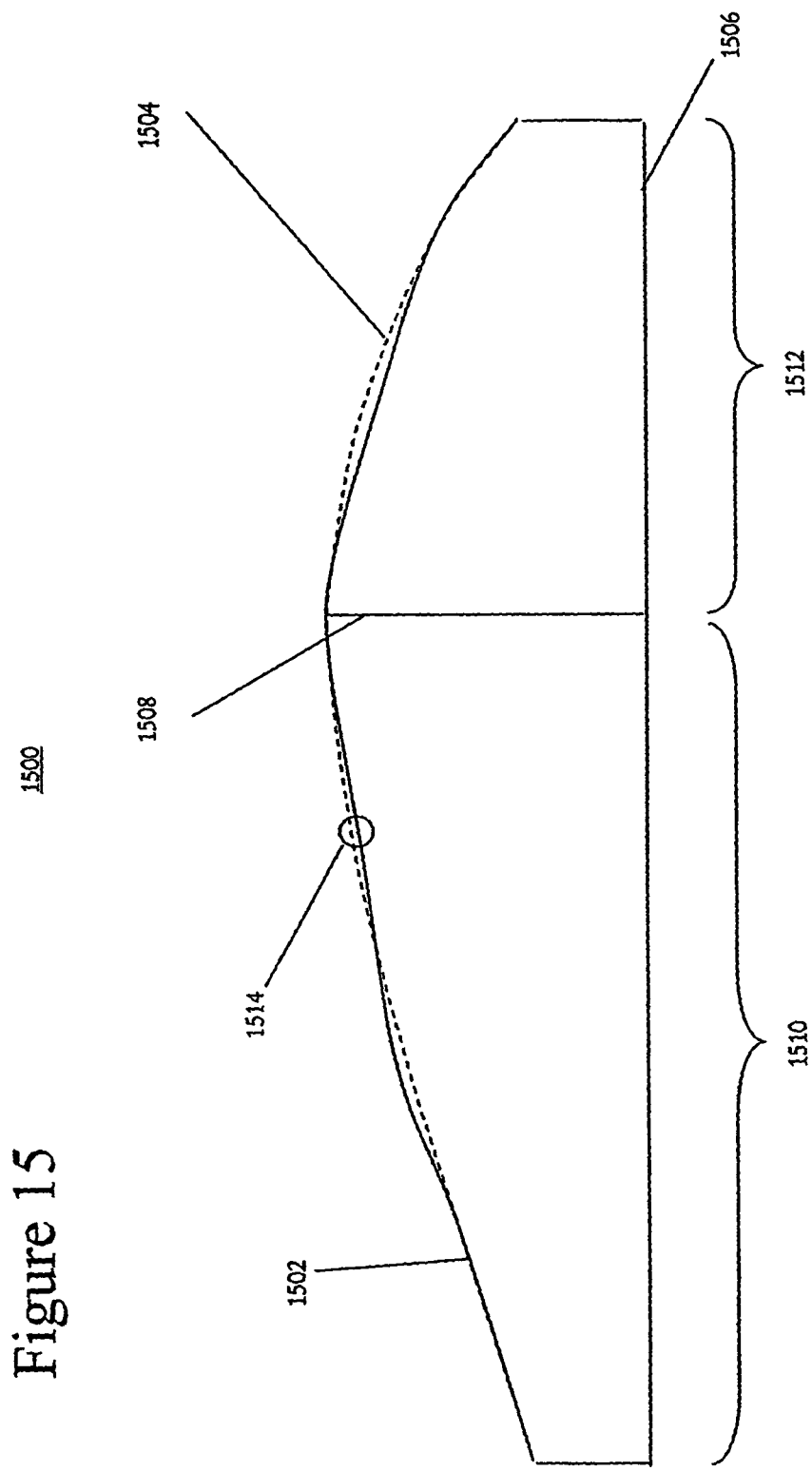
FIG. 15 is a side plan drawing illustrating an exemplary improved asymmetric lens according to the present invention.

FIG. 15 illustrates a similarly improved exemplary asymmetric lens for use with short wavelength light 1500. This exemplary asymmetric lens includes top asymmetric surface 1502, with deviation 1514 from predetermined asymmetric surface design shape, and bottom flat surface 1506. The asymmetry of this exemplary lens is based on the differing curvature of surface 1502 in first lens section 1510 and second lens section 1512, which are separated by line 1508. This creates two lens areas having different focal lengths. This asymmetry has been selected for ease of illustration and is not meant to be limiting. Other asymmetric lens surfaces, including surfaces of compound lens and multi-function optics lens, may be formed as well.

As described above with reference to FIG. 14, the surfaces of an asymmetric lens may have deviations due to mechanical processing marks from various mechanical processes that may be reduced, or eliminated, using the exemplary laser machining methods of the present invention.

Figure 16:
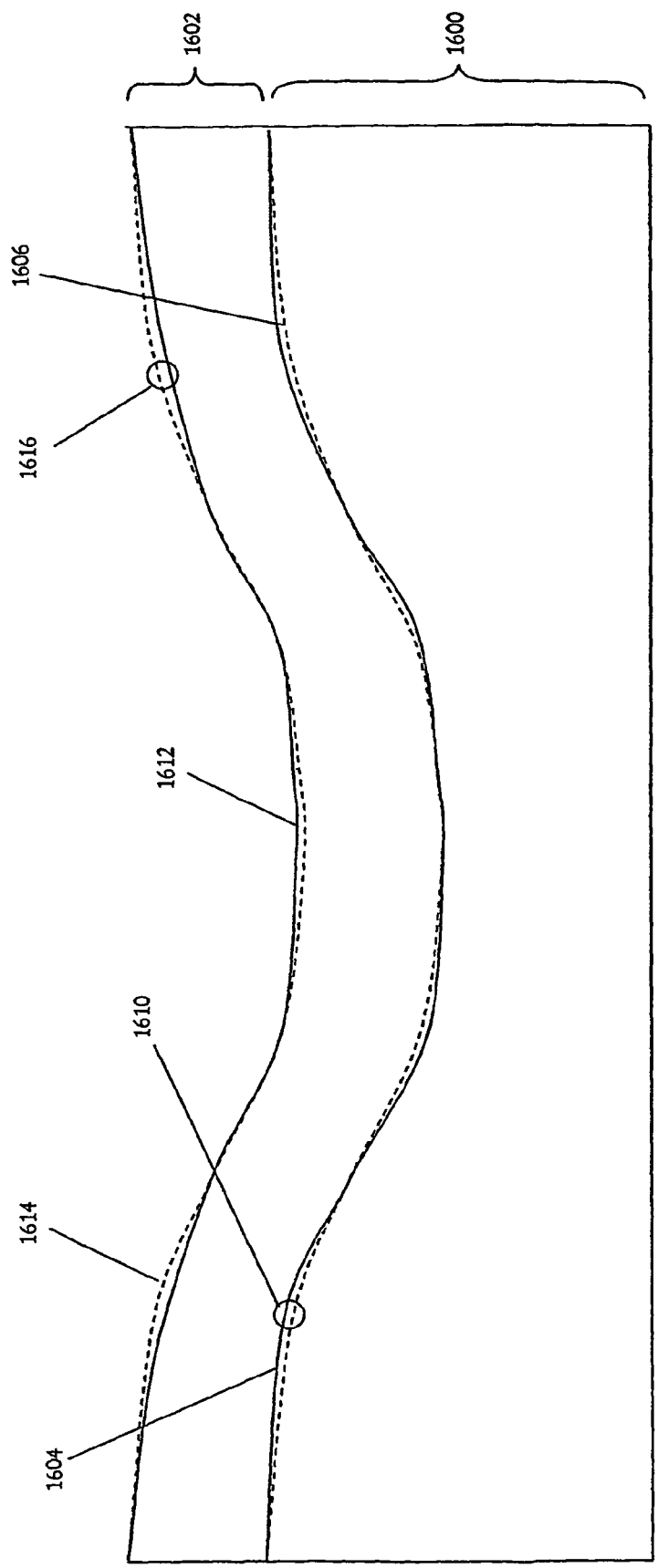
FIG. 16 is a side plan drawing illustrating an exemplary improved compression mold according to the present invention.

FIG. 16 illustrates an improved compression mold for short wavelength aspherical lenses. Although the exemplary compression mold shown in FIG. 16 includes mold body 1600 and release film 1602, it is contemplated that release layer 1602 may be omitted, particularly if mold body 1600 is formed of a material with good release properties.

Mold body 1600 formed of a mold material, including at least one of: tungsten-carbide; sapphire; a solid state carbon material; $Al_2O_3$; $Cr_2O_3$; SIC; $ZrO_2$; $Si_3N_4$; TiN; TiC; BN; Ni; Cr; Ti; W; Ta; Si; glass; a cermet incorporating TiN, TiC, $Cr_3C_2$, and/or $Al_2O_3$; and/or an alloy incorporating at least one of Ni, Cr, Ti, W, Ta, or Si. Mold body 1600 includes mold surface 1604 which has an aspherical mold surface shape that matches predetermined aspherical surface design shape 1606 with a maximum deviation of less than about 1 μm, desirably less than about 0.1 μm, preferably less than about 0.05 μm. Circle 1610 illustrates a deviation between mold surface 1604 and predetermined aspherical surface design shape 1606.

As described above with reference to FIGS. 14 and 15, the surfaces of a compression may have deviations due to mechanical processing marks from various mechanical processes that may be reduced, or eliminated, using the exemplary laser machining methods of the present invention.

Additionally, it is noted that a number of these mold materials such as tungsten-carbide, steel, and solid state carbon materials do not machine well with diamond tools. Mechanically roughing out compression molds from these materials using other tools, such as tungsten turning points and/or grinding wheels may lead to poor quality surface shape forms. Still, these materials may have desirable properties for use in compression molds. Poor quality surfaces having large deviations from predetermined aspherical surface design shape 1606 in compression molds formed of these materials may be improved using one of the exemplary laser machining method of the present invention, allowing use of these mold materials in high-precision compression molds.

Release film 1602 is formed on mold surface 1604 of mold body 1600, with release surface 1612 opposite the mold surface. Release film 1602 may be formed of one or more of: nickel, titanium, niobium, vanadium, molybdenum, platinum, palladium, iridium, rhodium, osmium, ruthenium, rhenium, tungsten, and tantalum.

Similar to mold surface 1604, release surface 1612 has an aspherical release surface shape matching predetermined aspherical surface design shape 1614 with a release surface maximum deviation of less than about 1 μm, desirably less than about 0.1 μm, preferably less than about 0.05 μm. Circle 1616 illustrates a deviation between release surface 1612 and predetermined aspherical surface design shape 1614. It is noted that predetermined aspherical surface design shape 1606 of the mold body and predetermined aspherical surface design shape 1614 of the release film are typically identical.

It is contemplated that similar compression molds may be formed for short wavelength asymmetric lenses or various microstructure for which surface design shapes having micron accuracies are desired. It is also contemplated that the a high-precision release film for a compression mold, such as release film 1602 may be formed on a lower quality mold body and the shape form of the release film improved using one of the exemplary laser machining method of the present invention to achieve a desired match to the predetermined surface design shape.

Figure 17:
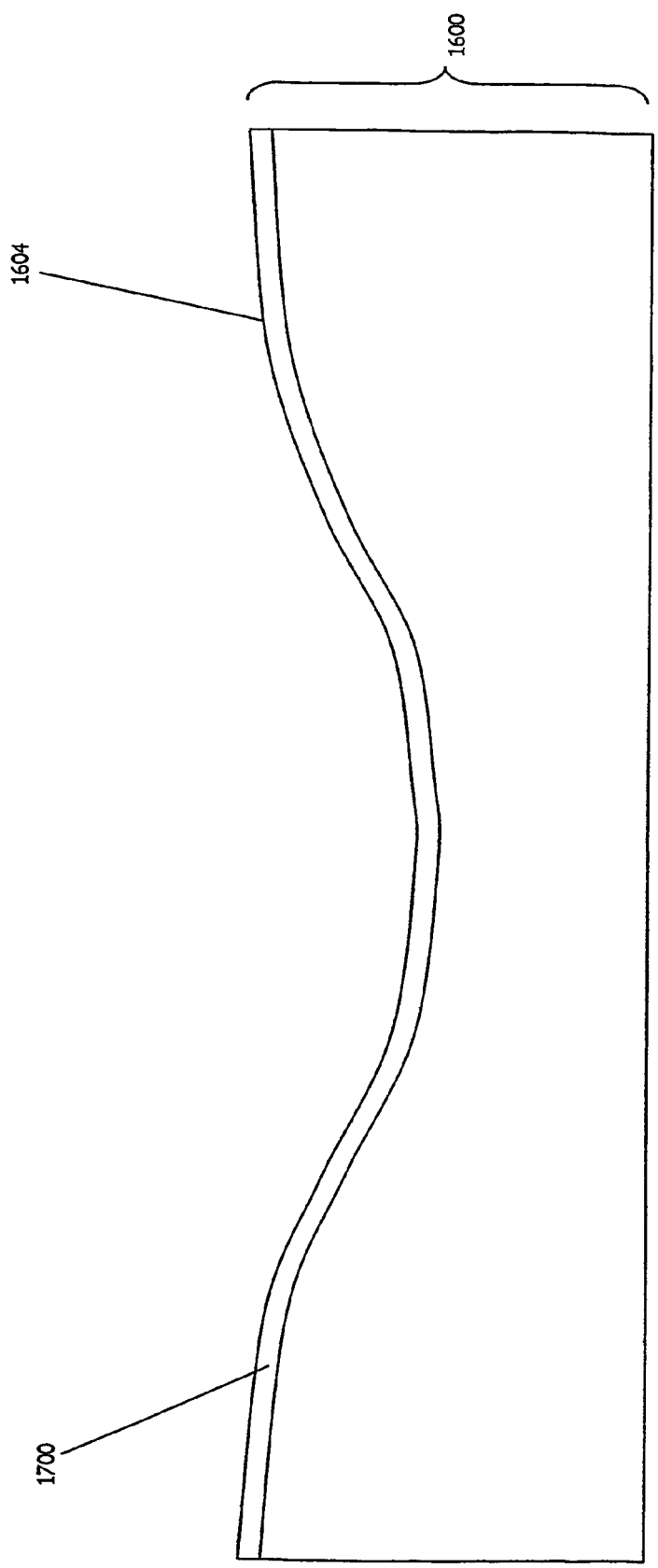
FIG. 17 is a side plan drawing Illustrating an alternative exemplary improved compression mold according to the present invention.

FIG. 17 illustrates another issue that may be important for the design of high-precision compression molds. The processing of mold body 1600 leads to the creation of damage layer 1700 on mold surface 1604. This damage layer is a portion of the mold material that has been changed during the processing of the mold surface. For example, the change may be a change in the crystal structure of the mold material, oxidation of the material, accumulated stress and deformation or distortion of the material, recasting of the material, etc. This damage layer may be caused by mechanical, chemical, thermal, laser, or other processing of the surface.

This damage layer may cause a number of problems for the compression mold. For example, if damage layer 1700 is an oxide layer, a release film layer may not adhere well to mold surface 1604. The film layer may stick but not be able to bear the force necessary for compression molding and may separate from the mold surface during use. If no release film layer is formed on the mold surface, damage layer 1700 may change the surface performance, possibly sticking to the material being molded or mechanically failing during the compression molding process. Additionally, the compression mold may be heated during use. Accumulated stress or strain in damage layer 1700 may be released by heating, deforming the surface shape. Therefore it is desirable to reduce this layer as much as possible. Mechanical and/or chemical processing of surfaces may lead to significant damage layers, possibly several microns thick. Laser and other radiant energy based processing methods may cause damage layers due to heating of the material in a heat affected zone around the irradiated material. Ultra-fast laser machining causes less heating of surrounding material, thus significantly reducing the size of the associated heat affected zone. The exemplary laser machining methods of the present invention may produce exemplary compression mold with a damage layer greatly reduced as compared to other processing methods. For example, a damage layer 10 nm thick or less may be produced using an exemplary ultra-fast laser processing method of the present invention.

Although many exemplary embodiments of the invention are described in terms of refining a lens mold or a lens, it is contemplated that the exemplary systems and methods described herein may be used to refine any feature formed in or on a material.

Although illustrated and described above with reference to certain specific embodiments, the present invention is nevertheless not intended to be limited to the details shown. Rather, various modifications may be made in the details within the scope and range of equivalents of the claims and without departing from the invention.

What is claimed is:

1. A method of improving a shape of a high-precision surface, comprising the steps of:
   a) providing a material with an initial shape on at least one face thereof;
   b) measuring errors in the initial shape of the high-precision surface, the errors being deviations from a desired shape; and
   c) correcting the errors in the initial shape of the high-precision surface by selectively applying pulses of light from a laser to the errors to ablate the deviations, wherein:
   the shape is a substantially circularly symmetric feature; and
   step (c) includes the steps of:
   c1) moving a beam spot of the laser along a perimeter of the substantially circularly symmetric feature in one of a clockwise direction or a counterclockwise direction at a rate of spin;
   c2) irradiating the high-precision surface along the perimeter of the feature with the pulses of light, at a pulse frequency selected such that centers of ablated regions from consecutively applied pulses are separated by a predetermined circumferential distance;
   c3) repeating steps (c1) and (c2) until the errors along the perimeter of the substantially circularly symmetric feature are substantially corrected;
   c4) radially moving the beam spot of laser by a predetermined radial distance to one of a smaller perimeter or a larger perimeter of the substantially circularly symmetric feature; and
   c5) repeating steps (c1), (c2), (c3), and (c4) until the errors of the initial shape are substantially corrected.

2. A method of improving a shape of a high-precision surface, comprising the steps of:
   a) providing a material with an initial shape on at least one face thereof;
   b) measuring errors in the initial shape of the high-precision surface, the errors being deviations from a desired shape; and
   c) correcting the errors in the initial shape of the high-precision surface by selectively applying pulses of light from a laser to the errors to ablate the deviations, wherein:
   the shape is a substantially circularly symmetric feature; and
   step (c) includes the steps of;
   c1) moving the material so that a perimeter of the substantially circularly feature passes through a beam spot of the laser in one of a clockwise direction or a counterclockwise direction at a rate of spin;
   c2) permitting the laser to pulse at a pulse frequency to apply pulses along the perimeter of the substantially circularly symmetric feature, wherein centers of ablated regions from consecutively applied pulses are separated by a predetermined circumferential distance;
   c3) repeating steps (c1) and (c2) until the errors along the perimeter of the substantially circularly symmetric feature are substantially corrected;
   c4) radially moving the material by a predetermined radial distance to one of a smaller or a larger perimeter of the substantially circularly symmetric feature; and
   c5) repeating steps (c1), (c2), (c3), and (c4) until the errors of the initial shape are substantially corrected.

3. The method of claim 1 or 2, wherein step (b) includes using at least one of a laser interferometer, white light interferometer, a linear variable displacement transducer, a scanning probe microscopy, a scanning tunneling microscope, an atomic force microscope, a near-field scanning optical microscope, or a shear-force microscope on the high-precision surface to measure the deviations from the desired shape.

4. The method of claim 1 or 2, wherein:
   step (b) includes determining a pulse schedule based on the errors in the initial shape; and
   step (c) includes moving a beam spot of the laser along a predetermined path over the at least one face of the surface and selectively permitting the pulses of light to irradiate portions of the surface according to the pulse schedule.

5. The method of claim 1 or 2, wherein:
   step (b) includes determining a pulse schedule based on the errors in the initial shape; and step (c) includes moving the material so that the at least one face passes through a beam path of the laser, and selectively permitting the pulses of light to irradiate portions of the surface according to the pulse schedule.

6. A method according to one of claims 4 or 5, wherein the pulse schedule is determined such that a bite distance is less than or equal to one half of a length of a region ablated by one pulse of light.

7. A method according to claim 1 or 2, wherein step (c) includes maintaining a predetermined angle of incidence of the pulses of light from the laser on one of:
the initial shape; or
the at least one face.

8. A method according to claim 1 or 2, wherein the step (c) includes activating the laser such that the pulses of light generated have a duration less than or equal to 1 nanosecond.

9. A method according to claim 1 or 2, wherein, step (a) includes at least one of:
placing the material in an assist gas, or
blowing the assist gas over the at least one face of the material.

10. A method according to claim 9, wherein step (c) includes selectively applying the pulses of light from the laser to chemically activate the assist gas over the errors, thereby ablating the deviations.

11. A method according to claim 9, wherein the assist gas includes at least one of $N_2$, Ar, $O_2$, air, $CF_4$, Cl, $H_2$, or $SF_6$.

12. A method according to one of claims 1 or 2, wherein step (c) further includes at least one of:
varying the pulse frequency at each perimeter to maintain the predetermined circumferential distance between the centers of the ablated regions from consecutively applied pulses; or
varying the rate of spin of the beam spot at each perimeter to maintain the predetermined circumferential distance between the centers of the ablated regions from consecutively applied pulses.

13. A method according to one of claims 1 or 2, wherein the predetermined circumferential distance is less than or equal to one half of a diameter of the ablated regions.

* * * * *

UNITED STATES PATENT AND TRADEMARK OFFICE
CERTIFICATE OF CORRECTION

PATENT NO. : 8,491,353 B2  Page 1 of 1
APPLICATION NO. : 10/567324
DATED : July 23, 2013
INVENTOR(S) : Kataoka et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2193 days.

Signed and Sealed this
Eighth Day of September, 2015

Michelle K. Lee
*Director of the United States Patent and Trademark Office*